(12) United States Patent  (10) Patent No.: US 6,522,380 B2
Lee et al.  (45) Date of Patent: *Feb. 18, 2003

(54) LIQUID CRYSTAL DISPLAY HAVING HIGH TRANSMITTANCE AND HIGH APERTURE RATIO

(75) Inventors: Seung Hee Lee, Kyongki-do (KR); Seok Lyul Lee, Seoul (KR); Woo Ho Choi, Seoul (KR); Jung Yeal Lee, Kyoungki-do (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/797,761

(22) Filed: Mar. 1, 2001

(65) Prior Publication Data

US 2001/0010576 A1 Aug. 2, 2001

Related U.S. Application Data

(62) Division of application No. 09/087,422, filed on May 29, 1998, now Pat. No. 6,233,034.

(30) Foreign Application Priority Data

Dec. 29, 1997 (KR) ............................................. 97-76720
Mar. 18, 1998 (KR) ............................................. 98-9243

(51) Int. Cl.[7] ............................................. G02F 13/43
(52) U.S. Cl. ............................................. 349/141
(58) Field of Search ............................................. 349/141

(56) References Cited

U.S. PATENT DOCUMENTS

| 4,617,646 | A |   | 10/1986 | Yang |
| 4,773,738 | A | * | 9/1988 | Hayakawa et al. ......... 349/141 |
| 5,414,545 | A |   | 5/1995 | Lee |
| 5,426,313 | A |   | 6/1995 | Sukegawa et al. |
| 5,434,690 | A |   | 7/1995 | Hisatake et al. |
| 5,576,587 | A |   | 11/1996 | Takahashi et al. |
| 5,576,867 | A |   | 11/1996 | Baur et al. |
| 5,808,705 | A | * | 9/1998 | Hishida et al. ................ 349/33 |
| 5,886,762 | A |   | 3/1999 | Lee et al. |
| 5,914,762 | A |   | 6/1999 | Lee et al. |
| 5,946,060 | A | * | 8/1999 | Nishiki et al. ................. 349/48 |
| 6,351,300 | B1 | * | 2/2002 | Park et al. .................... 349/141 |

FOREIGN PATENT DOCUMENTS

| EP | 0667555 | 8/1995 |
| EP | 0732612 | 9/1996 |
| EP | 0814367 | 12/1997 |

* cited by examiner

Primary Examiner—Kenneth Parker
(74) Attorney, Agent, or Firm—Townsend and Townsend and Crew LLP

(57) ABSTRACT

Disclosed is a liquid crystal display comprising: a first substrate and a second substrate, the first substrate being disposed opposite the second substrate and being disposed a first distance apart, each of the substrates having an inner surface and an outer surface opposite the inner surface; a liquid crystal layer sandwiched between the inner surfaces of the substrates, the liquid crystal layer including a plurality of liquid crystal molecules; a first electrode formed on the inner surface of the first substrate, the first electrode having a first width; and a second electrode formed on the inner surface of the first substrate, the second electrode having a second width, and spaced apart from the first electrode by a second distance, the first electrode and the second electrode being capable of aligning the liquid crystal molecules using an electric field produced between the first electrode and the second electrode, wherein the first distance is greater in length than the second distance, and the first and second electrodes each has a width to such a degree that the liquid crystal molecules above the first and second electrodes are substantially aligned by the electric field.

49 Claims, 29 Drawing Sheets

90:CR=90
70:CR=70
50:CD=50
30:CR=30
10:CR=10

LIQUID CRYSTAL DISPLAY HAVING HIGH TRANSMITTANCE AND HIGH APERTURE RATIO

CROSS-REFERENCE TO RELATED APPLICATIONS

This application claims priority from the following applications filed with the Korean Industrial Property Office, the disclosures of which are hereby incorporated by reference:

Patent Application No. 97-76720, filed Dec. 29, 1997, entitled "LIQUID CRYSTAL DISPLAY DEVICE"; and Patent Application No. 98-9243, filed Mar. 18, 1998, entitled "LCD HAVING HIGH TRANSMITTANCE AND HIGH APERTURE RATIO AND METHOD FOR MANUFACTURING THE SAME."

This divisional application also claims priority from U.S. patent application Ser. No. 09/087,422, filed May 29, 1998, now U.S. Pat. No. 6,233,034, which is incorporated by reference.

BACKGROUND OF THE INVENTION

The present invention relates to a display and a method of manufacturing the same. More particularly, the present invention provides a novel liquid crystal display having a relatively high transmittance and relatively high aperture ratio. The present invention also provides a method of manufacturing the same.

Rapid progress in the device performance of active matrix liquid crystal displays("LCDs") has opened a wide range of the applications, such as flat panel television("TV") systems, and high-information content monitors for portable computers.

A common type of technology used in these displays is conventional twisted nematic("TN") display mode. Conventional TN display mode, however, has intrinsic properties of narrow viewing characteristics and slow response time. Most particularly, TN has slow response time for gray scale operation.

In order to solve these limitations, various techniques. used in liquid crystal displays(i.e., LCDs) have been suggested or suggested. As merely an example, techniques such as a multi-domain TN structure, and an optically compensated birefringence("OCB") mode that compensates physical characteristics of the liquid crystal molecules have been proposed.

Although the multi-domain structure is often useful in improving the viewing angle, any enhancement of the viewing zone is generally limited. Additionally, an intrinsic property of slow response time still remains unsolved, in part, and processes for forming the multi-domain structure are often complicated and difficult to achieve. In contrast, the OCB mode has typically proved to have better electro-optic performances, including viewing characteristics and response time. The OCB mode, however, may have difficulties in controlling conformation of the liquid crystal molecules for self-compensation structure via a bias voltage.

Other technologies such as an in-plane switching ("IPS") mode where electrodes for controlling the liquid crystal molecules are formed on the same substrate has been proposed. As an example, M. Oh-e, M. Ohta, S. Aratani, and K. Kondo in "Proceeding of the 15th International Display Research Conference", p. 577 by Society for Information Display and the intrinsic of Television Engineer of Japan (1995) describe an IPS mode. The display with IPS mode also has numerous limitations. Since these displays often use materials that are opaque, display transmittance often decreases. In some cases, a back light with high intensity light is used, which is undesirable for lower powered portable computing applications, as well as others. Additional limitations include difficulty in manufacturing, which often involves complex planarization processes. These and other limitations are described throughout the present specification.

From the above, it is seen that an improved technique for fabricating an LCD display is highly desirable.

SUMMARY OF THE INVENTION

According to the present invention, a technique including a method and a device for the manufacture of an improved display is provided. In an exemplary embodiment, the invention increases an aperture ratio of the liquid crystal display and the transmittance thereof. In other aspects, the invention improves the topology of the structure of the lower substrate without the need of additional planarization process, which are commonly used in conventional devices.

According to one aspect of the invention, a liquid crystal display is provided. The display includes a variety of elements such as a first substrate and a second substrate, one being disposed opposite the other a first distance apart. Each substrate has an inner surface and an outer surface that is opposite the inner surface. The display also has a liquid crystal layer sandwiched between the inner surfaces of the substrates. The liquid crystal layer has a plurality of liquid crystal molecules. A first electrode is formed on the inner surface of the first substrate and has a first width. A second electrode is formed on the inner surface of the first substrate and has a second width. The second electrode is spaced apart by a second distance from the first electrode. These electrodes align the liquid crystal molecules using an electric field produced between the electrodes. The first and second electrodes are formed of a transparent conductive material (e.g., ITO). The display has the first distance that is greater than the second distance. Preferably, the first and second electrodes each has a width to such a degree that the liquid crystal molecules above the first and second electrodes are substantially aligned by the electric field.

According to another aspect of the invention, a liquid crystal display is provided. The display includes a variety of elements such as a first substrate and a second substrate, one being disposed opposite the other a first distance apart. Each substrate has an inner surface and an outer surface that is opposite the inner surface. The display also has a liquid crystal layer sandwiched between the inner surfaces of the two substrate. The liquid crystal layer has a plurality of liquid crystal molecules. A first electrode is disposed on the inner surface of the first substrate. The first electrode comprises a plurality of strips, each of the strips having a first width, and spaced apart by a second distance from another strip adjacent thereto. A second electrode is also disposed on the first substrate. The second electrode comprises a plurality of strips, each of the strips being disposed between the strips of the first electrode, having a second width, and being spaced apart by a third distance from another strip adjacent thereto, each of the strips of the second electrode being separated from each of the strips of the first electrode adjacent thereto with a fourth distance. An insulating layer is formed between the first and second electrodes. The insulating layer insulates the first electrode and the second electrode each other. The first electrode and the second electrode each is made of a transparent conductor, and the first distance is greater in length than the fourth distance. The second width is smaller than the second distance, and the first width is smaller than the third distance. Preferably, the strips of the second electrode each has a width to such a degree that the liquid crystal molecules overlying the strips of the first electrode and the strips of the second electrode are substantially aligned in the presence of the electric field produced between the strips of the first electrode and the strips of the second electrode, and the first width is smaller than the third distance.

According to a further aspect of the invention, a liquid crystal display is provided. The display includes a variety of elements such as a first substrate and a second substrate, one being disposed opposite the other a first distance apart. Each substrate has an inner surface and an outer surface that is opposite the inner surface. The display also has a liquid crystal layer sandwiched between the inner surfaces of the two substrate. The liquid crystal layer has a plurality of liquid crystal molecules. A first electrode is formed on the inner surface of the first substrate. The first electrode has a squared plate structure. An insulating layer is disposed on the inner surface of the first substrate including the first electrode. A second electrode is disposed on the insulating layer. The second electrode comprises a plurality of strips, the strips each being disposed to overlap with the first electrode and to have a first width and a second distance therebetween, wherein surface of the first electrode is partially exposed through spaces between the strips, the exposed portions of the first electrode each having a width of the second distance. The first and second electrodes each is made of a transparent conductor. The first distance between the first and second substrates is greater than a thickness of the insulating layer, and a second width and the first width each is to such a degree that the liquid crystal molecules above the exposed portions of the first electrode and the strips of the second electrode are substantially aligned by the electric field produced between the exposed portions of the second electrode and the strips of the second electrode.

According to still another aspect of the invention, a method for fabricating a liquid crystal display is provided. The method includes a variety of steps. First, a first transparent substrate is provided. Afterwards, a first transparent conductive layer is formed on the first transparent substrate. Thereafter, a first metal film is deposited on the first transparent conductive material and is then patterned to form a plurality of gate bus lines and a common signal line. Afterwards, a first transparent conductor film is deposited on the resulting structure and is then patterned to form a plurality of counter electrodes each including a plurality of strips that are orthogonal to the gate bus line. Thereafter, a gate insulator is formed on the resulting structure including the gate bus lines, common signal lines, and counter electrodes. A channel layer is formed on a selected portion of the gate insulating layer. A second transparent conductive layer is deposited on the gate insulator and is then patterned to form a plurality of pixel electrode each including a plurality of strips being arranged parallel to the strip of the counter electrode, and placed on the gate insulating layer between the strips of the counter electrode. A second metal film is deposited on the gate insulating layer and is then patterned to form a plurality of data bus lines that are orthogonal to the gate bus line, sources and drains. A first alignment layer is formed on the resulting structure.

According to even another aspect of the invention, a method for fabricating a liquid crystal display is provided. The method includes a variety of steps. First, a first transparent substrate is provided. A first transparent conductive layer is formed on the first transparent substrate and is then patterned to form a plurality of counter electrodes. A first metal film is deposited on the first transparent conductive layer and is then patterned to form a plurality of gate bus lines and a common signal line such that the common signal line is contact with each of the counter electrodes. A gate insulating layer is formed on the resulting structure including the gate bus lines, the common signal line, and the counter electrodes. A channel layer is formed on a selected portion of the gate insulating layer. A second transparent conductive layer, is deposited on the gate insulating layer and is then patterned to overlap with the counter electrode, to form a plurality of pixel electrodes. A second metal film is deposited on the gate insulating layer and is then patterned, to form a plurality of data bus lines, sources and drains. A first alignment layer is formed on the resultant structure. Here, the step for forming the gate bus lines and common signal line and the step for forming the counter electrode are exchangeable each other.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

I. Conventional LCD Displays

Figure 1:
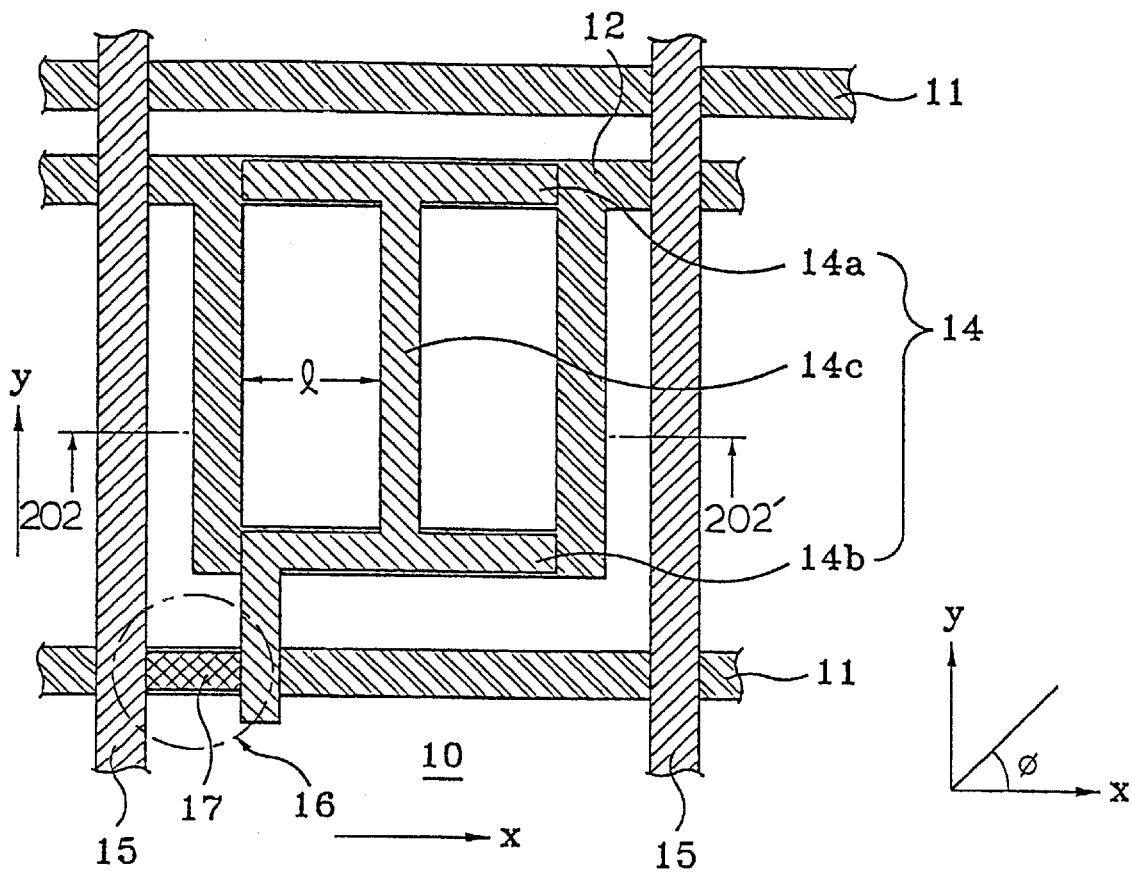
FIG. 1 is a simplified plan view of a conventional unit pixel and portions of adjacent pixel regions surrounding it in a liquid crystal display.

FIG. 1 is a simplified plan view showing a conventional unit pixel region and portion adjacent pixel regions surrounding it in the IPS-mode liquid crystal display. Referring to FIG. 1, the liquid crystal display includes a plurality of gate bus lines 11 arranged in parallel with each other on a lower substrate in a first direction, and a plurality of data bus lines 15 arranged in parallel with each other on the lower substrate in a second direction normal to the first direction. The plurality of gate bus lines 11 and the plurality of data bus lines 15 are arranged in a matrix configuration, to thereby define a plurality of pixel regions each bounded by a pair of gate bus lines and a pair of data bus lines. The plurality of gate bus lines 11 and the plurality of data bus lines 15 are insulated from each other with gate insulating layer(not shown) intervening between the gate bus lines and the data bus lines. A counter electrode 12 is formed as a rectangular frame structure within a respective pixel region and is disposed on a surface of the lower substrate altogether with the gate bus lines 12.

A pixel electrode 14 is arranged on a surface of the counter electrode 12 with the gate insulating layer(not shown) intervening therebetween. The pixel electrode 14 is arranged in "I" letter configuration to thereby divide a region bounded by the counter electrode 12. The pixel electrode 14 includes a web portion 14c extending in the Y direction, to thereby divide the region surrounding the counter electrode 12 into two portions; and a first and second flange portions 14a and 14b overlapping with the counter electrode 12 in the X direction. Here, the two flange portions 14a and 14b are arranged opposite and in parallel with each other.

A thin film transistor 16 which connects with a corresponding one of the data bus lines and a corresponding one of the pixel electrodes is formed on a crossing point of the gate bus lines 11 and the data bus lines 12. The transistor 16 includes a gate electrode formed as an integral tab-like portion projected into a respective pixel portion from the gate bus lines 11; a drain electrode formed as a tab-like protruding portion of the data bus lines 15; a source electrode extending from the pixel electrode 14; and a channel layer 17 formed over a gate electrode.

An additional-capacitance typed capacitor Cst is formed in an overlapped portion between the counter electrode 12 and the pixel electrode 14. Although not shown in FIG. 1, an upper substrate having a color filter(not shown) is disposed opposite the lower substrate 10 with a selected distance. Here, the gate bus lines 11, the counter electrode 12, the pixel electrode 14 and the data bus lines each is formed of an opaque metal such as aluminum, titanium, tantalum, chromium, or the like.

A process for forming the LCD having the IPS mode will be described with reference to FIGS. 1 and 2, for example.

Figure 2:
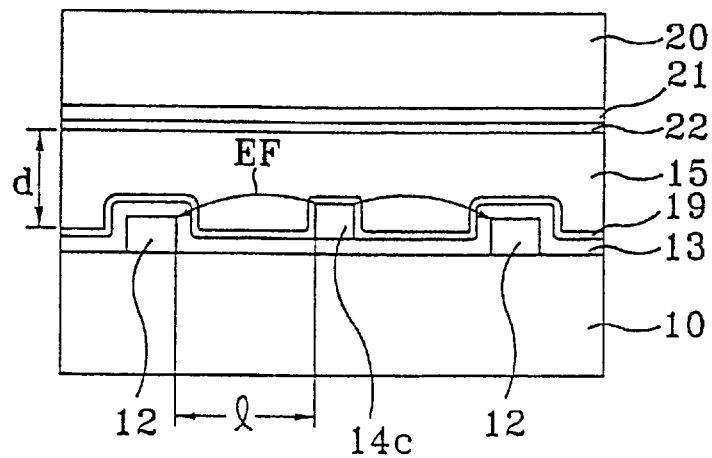
FIG. 2 is a simplified section view taken along the line 202–202' of FIG. 1.

FIG. 2 is a cross sectional view taken from line II—II' of FIG. 1. Metal layer is formed for example, with a thickness of about 2500 to about 3500 Angstroms on a surface of the lower substrate 10. The metal layer is made of an opaque metal such as aluminum, titanium, tantalum, chromium or the like. Next, the metal layer is patterned thereby to form the gate bus lines 11 and the counter electrode 12. The counter electrode 12 only is shown in FIG. 2. A gate insulating layer 13 is also formed on a surface of the lower substrate 10 having the gate bus line 11 and the counter electrode 12. Afterwards, a channel layer 17 of the thin film transistor 16 is formed on a selected portion of the gate insulating layer 13 and a metal layer is formed with a thickness of about 4000 to 4500 Angstroms on a surface of the resultant structure having the gate insulating layer 13 on which the channel layer 17 is formed. Here, the metal layer is made of an opaque metal such as aluminum, titanium, tantalum, chromium, or the like. Following the step of forming the metal layer, the metal layer is patterned, to thereby form a pixel electrode 14 and data bus lines 15. In FIG. 2, the pixel electrode 14 only is shown. Next, a first alignment layer 19 is formed on a resultant surface of the lower substrate 10.

An upper substrate 20 is disposed opposite the lower substrate 10 with a selected distance d. Here, the distance, i.e., a cell gap between the two substrates 10 and 20(hereinafter the cell gap is referred to as d) is smaller than the distance l between the web portion 14c of the pixel electrode(hereinafter the web portion 14c of the pixel electrode is referred as the pixel electrode 14) and the counter electrode 12. This is to make an electric field produced between the pixel electrode and the counter electrode substantially parallel with surfaces of the substrates 10 and 20.

On an inner surface of the upper substrate 20 disposed opposite the lower substrate 10 is formed a color filter 21. On a surface of the color filter 21 is also formed a second alignment layer 22. Here, the first and second alignment layers 19 and 22 serve to align liquid crystal molecules(not shown) such that longer axes thereof are substantially parallel with the surfaces of the substrates 10 and 20 in an absence of the electric field between the pixel electrode 14 and the counter electrode 12. And, the first and second alignment layers 19 and 22 are rubbed such that an angle between the rubbing axis and the gate bus lines 11 is set to be a selected angle.

And, although not shown in the drawing, a polarizer is disposed on an outer surface of the lower substrate 10 and an analyzer is disposed on an outer surface of the upper substrate 20.

In the liquid crystal display having an IPS mode, when a scanning signal is applied to a corresponding one of the gate bus lines 11 and a display signal is applied to a corresponding one of the data bus lines 15, a thin film transistor 16 which is formed on a crossing point of the gate bus lines 11 and the data bus lines 12 to which the signals are applied is turned on or off. If the thin film transistor is turned on, the display signal of the data bus lines 15 is transmitted to the pixel electrode 14 via the thin film transistor 16 and common signals are continue to be applied to the counter electrode 12. Therefore, the electric field is produced between the counter electrode 12 and the pixel electrode 14.

At this time, as shown in FIG. 2, since a distance l between the counter electrode 12 and the pixel electrode 14 is greater than that of the cell gap d, an electric field E which is substantially parallel with the surfaces of the substrate is produced. Therefore, the liquid crystal molecules within the liquid crystal layer are twisted so that optical axes thereof are in parallel with the electric field E, according to dielectric anisotropy characteristics of the liquid crystal molecules. Therefore, a user views the longer axes of the liquid crystal molecules on the screen in all directions and a viewing angle of the liquid crystal display is thus enhanced.

Conventional liquid crystal displays having the IPS mode have numerous limitations. Referring to for example, the liquid crystal display having the IPS mode shown in FIGS. 1 and 2, the counter electrode 12 and the pixel electrode 14 made of an opaque metal material such as aluminum are disposed on a light transmittance region, i.e., the lower substrate 10. Therefore, an aperture ratio of the liquid crystal display decreases, and the transmittance thereof also decreases. In addition, so as to obtain an appropriate brightness, a backlight with high intensity must often be used and thus an electrical consumption increases, which is often undesirable.

To solve these limitations, a counter electrode 12 and a pixel electrode 14 made of a transparent material have been proposed. In such a liquid crystal liquid display the aperture ratio is often increased, but the transmittance is often not improved. To produce an in-plane electric field, the distance l between the electrodes 12 and 14 must often be set to be greater than the cell gap d. To obtain a suitable intensity of the electric field to align the liquid crystal molecules, the electrodes 12 and 14 have relatively large dimension of width, for example, 10 to 20 $\mu$m. These limitations to the electrodes 12 and 14 create an electric field substantially parallel with the surfaces of the substrates to be produced between the electrodes 12 and 14. The electric field, however, has little affect the liquid crystal molecules positioned right above the upper surfaces of the electrodes 12 and 14 having the large width to thereby have sparse equipotential lines in a portion above the upper surfaces of the electrodes. As the result, since the liquid crystal molecules above the upper surfaces of the electrodes continue to hold an initial configuration even in the presence of the electric field, the transmittance is little increased.

Figure 3:
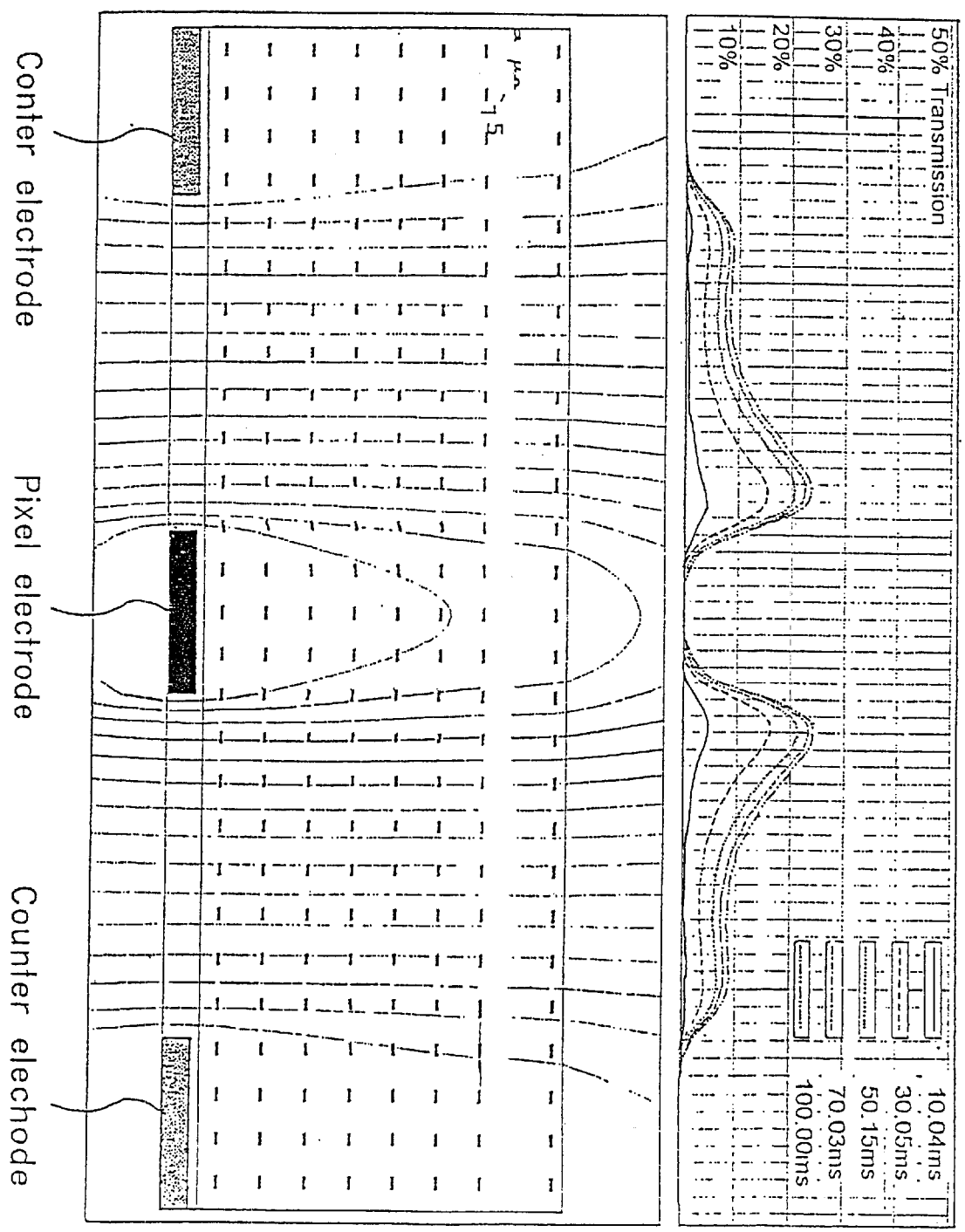
FIG. 3 is a simplified simulation result showing the transmittance variation according the lapse of time after the application of the electric field.

FIG. 3 shows the simulation result of the transmittance variation in the unit pixel region according to the lapse of time after the application of an electric field in the conventional liquid crystal display with the structure of the FIGS. 1 and 2. In FIG. 3, upper box represents the transmittance variation and lower box distribution of electric force lines produced between the counter electrode and the pixel electrode wherein the electric force lines are equipotential lines. Reference numeral 15d represents liquid crystal molecules. Here, the liquid crystal display has the counter electrode and the pixel electrode made of an opaque metal. The distance between the counter electrode and the pixel electrode is about 20 $\mu$m and the width of the counter electrode and the width of the pixel electrode each is about 10 $\mu$m and the cell gap is about 4.5 $\mu$m. An angle between the rubbing axis of the first alignment layer and the electric field direction is about 22 degrees. A voltage which is applied to the pixel electrode is about 8 V. As shown in FIG. 3, it is noted that the transmittance approaches only 23% even after the lapse of about 100 ms. This result indicates that response time is very slow.

As shown in FIG. 3, according to the simulation result, in the presence of the electric field, in an upper portion above the counter electrode and the pixel electrode, sparse equipotential lines are shown, which indicate the intensity of the electric field to be small. Therefore, the liquid crystal molecules positioned above the two electrodes little move. As the result, it is noted that the transmittance above the two electrodes is about 0%. In addition, even when the counter electrode and the pixel electrode are made of the transparent material with the width described above, the liquid crystal molecules positioned above the two electrodes can hardly move, which is a similar fashion to the case that the two electrodes are made of the opaque material. Therefore, it is anticipated that the same level of transmittance as in the case of the opaque electrodes will be also obtained although the two electrodes are made of transparent material.

Returning to FIGS. 1 and 2, in an aspect of the fabricating method of the conventional liquid crystal display, the counter electrode 12 is formed simultaneously with the gate bus lines 11, and the pixel electrode 14 is formed simultaneously with the data bus lines 15 to a thickness and more of 3,000 Angstroms. Although these simultaneous forming steps of two different layers are conducted for the purpose of simplifying the fabrication process thereof, they cause large height difference between the counter electrode 12 and the pixel electrode 14. The reason is because the thicknesses of the counter electrode 12 and the pixel electrode 14 are formed with respect to appropriate thicknesses of the gate bus line and the data bus line 11 and 15, not formed with respect to appropriate thicknesses thereof. In further detail, although it is possible that the counter electrode 12 and the pixel electrode 14 can be formed to a thickness of about 1,000 Angstroms, the counter electrode 12 and the pixel electrode 14 each is formed to a thickness of more of 3,000 Angstroms, thereby to cause a height difference of above 3000 Angstroms therebetween. Because of such height difference of the counter electrode 12 and the pixel electrode 14, the topology is bad in the surface of the lower substrate of the liquid crystal display. And therefore an additional planarization process is required. In addition, if the planarization process is not performed, there is a difficulty in carrying out the following rubbing process of the alignment layers. These and other limitations are often present in conventional LCD displays.

II. Present LCD Displays

Hereinafter, selected embodiments of the present invention will be explained in detail with reference to the accompanying drawings. These drawings are merely illustrations and should not limit the scope of the claims herein. One of ordinary skill in the art would recognize other variations, modifications, and alternatives.

Figure 4:
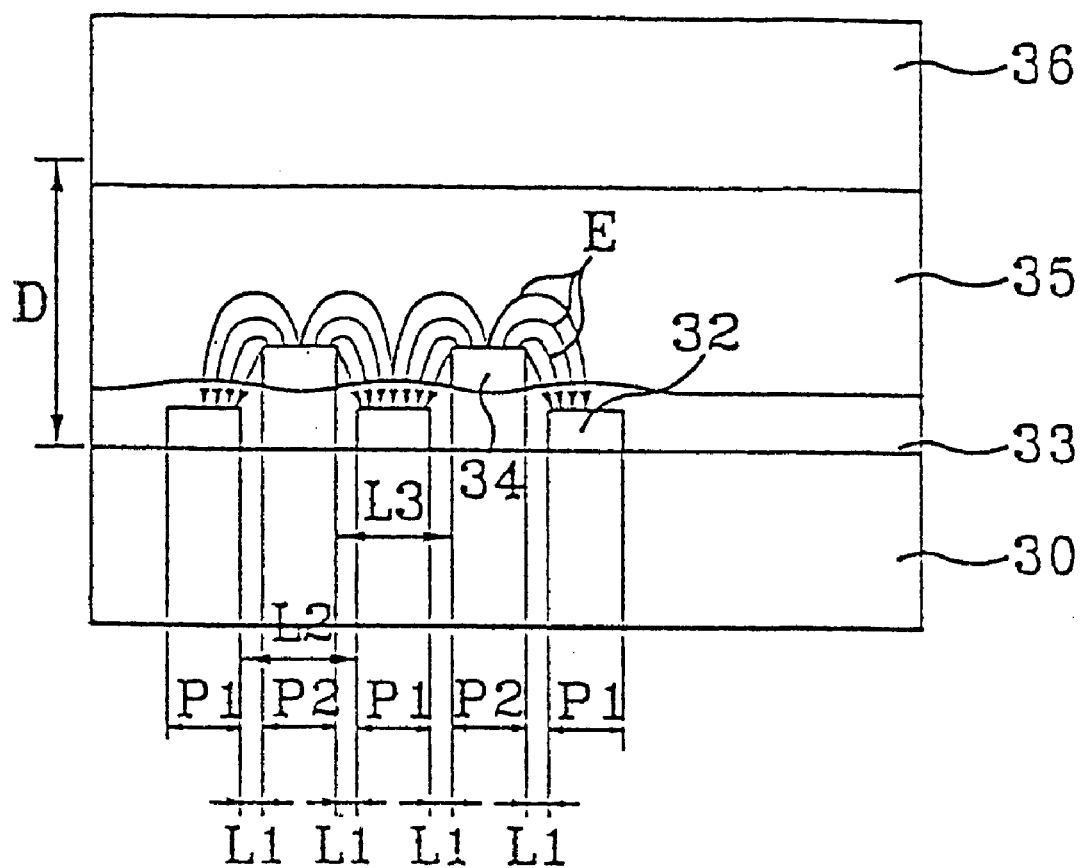
FIG. 4 is a simplified sectional view of the liquid crystal display according to an embodiment of the present invention.

As shown in FIG. 4, in the present invention, to improve transmittance and aperture ratio of a liquid crystal display with an IPS mode, a first electrode 32 and a second electrode 34 are respectively formed on inner surface of a lower or first substrate 30 with an insulating layer 33 intervening therebetween. The first electrode 32 and the second electrode 34 are made of transparent conductive material. An upper or second substrate 36 is disposed opposite the first substrate 30 such that their inner surfaces are confronted each other. A liquid crystal layer 35 is sandwiched between the first and second substrate 30 and 36. In the FIG. 4, a cell gap D designates an interval between the first and second substrates 30 and 36.

In the present invention, the reason why the first and second electrodes 32 and 34 are made of transparent conductive material is to enlarge the area where incident light transmits through unit pixel region, thereby increasing aperture ratio and transmittance. The present invention has, among others, these aspects, which provide an improved display. In a specific embodiment, the first and second electrodes 32 and 34 are disposed a first distance L1 apart from each other or can be overlapped with each other. The first distance L1 between the first and second electrodes 32 and 34 is smaller than the cell gap D between the first and second substrates 30 and 36. The widths P1 and P2 of the first and second electrodes 32 and 34 in the present invention are as narrow as possible or practical according to design rule.

From the above elements, which can be used alone or in combination, the width P1 of the first electrode 32 is equal to or can be different from the width P2 of the second electrode 34. Relationship between the widths P1 and P2 is described in the following embodiment. Also, a second distance L2 between the first electrodes 32 adjacent to each other is equal to or can be different from the width P2 of the second electrode 34. Further, a third distance L3 between the second electrodes 34 adjacent to each other is equal to or can be different from the width P1 of the first electrode 32.

The above aspects occur, in part, for these reasons. If the first distance L1 is smaller than the cell gap D, fringe field E which is parabolic electric field with electric force lines of parabolic form rather than in-plane field with electric force lines of straight line form, is produced between the first and second electrodes 32 and 34 in the presence of the electric field. The electrodes 32 and 34 must have a narrow width enough to densify equipotential lines above the electrodes 32 and 34 so that liquid crystal molecules disposed above the electrodes are substantially aligned. Therefore, it is preferable to form the width of the electrodes as narrow as possible. On the other hand, when electric field produced between the electrodes 32 and 34 has an intensity enough to substantially align the liquid crystal molecules disposed between the electrodes 32 and 34, the electrodes 32 and 34 must have a width greater than a selected range. Accordingly, the widths of the electrodes 32 and 34 must be determined considering these circumstances.

In addition, a polarizer system(not shown) can be added to the liquid crystal display described above such that only the incident light beams are transmitted when liquid crystal molecules are tilted in the presence of the electric field. By doing so, the liquid crystal molecules move at all pixel regions of the liquid crystal display, to thereby improve transmittance.

In FIG. 4, reference symbol E designates electric field lines produced between the first and second electrodes 32 and 34. The electric filed lines includes a parabolic field line component and a linear field line component.

1. Present Embodiment 1

Figure 5A:
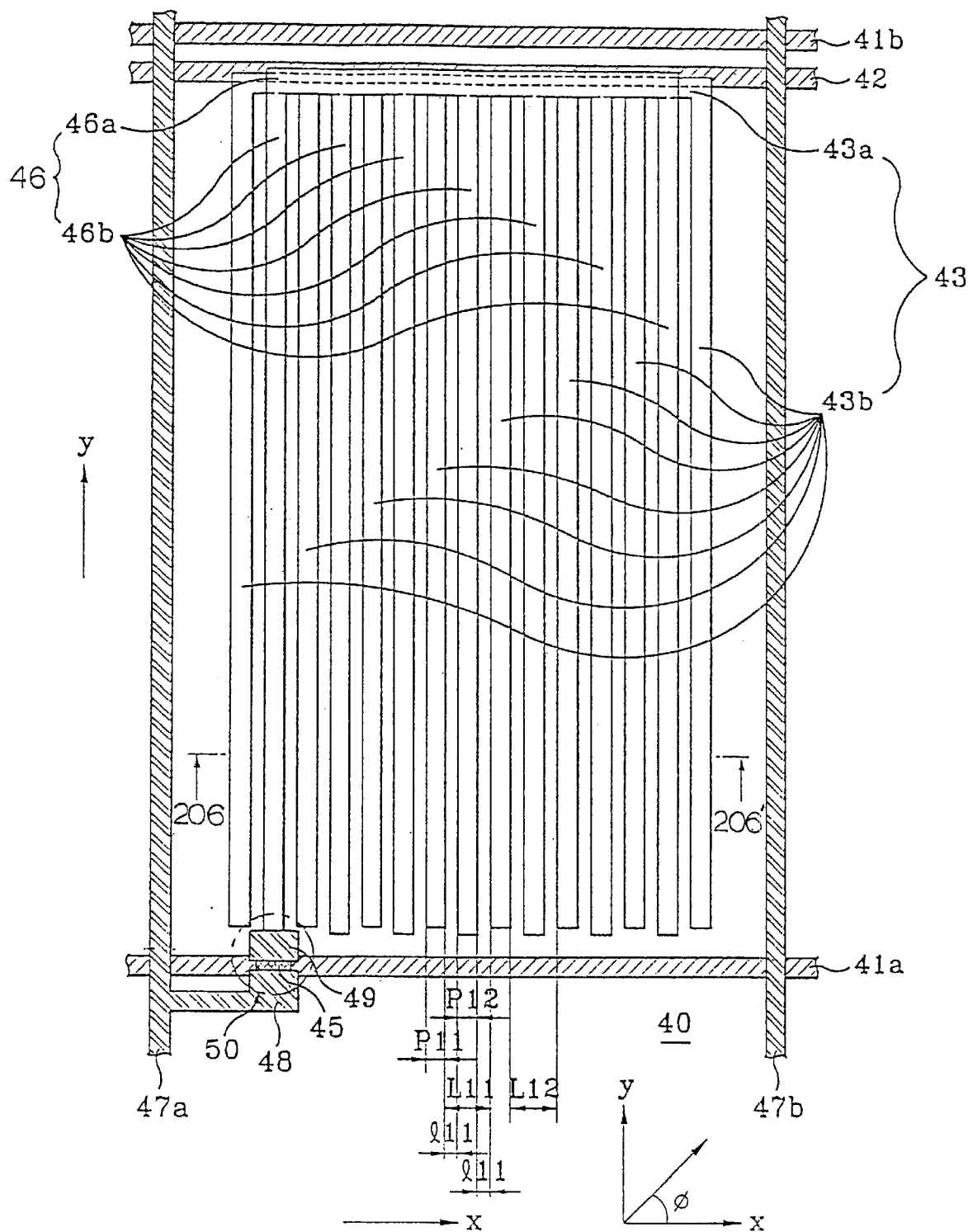
FIGS. 5A and 5B are simplified plan views of unit pixel region and portions of adjacent pixel regions surrounding it in the liquid crystal display according to embodiments of the present embodiment.
Figure 5B:
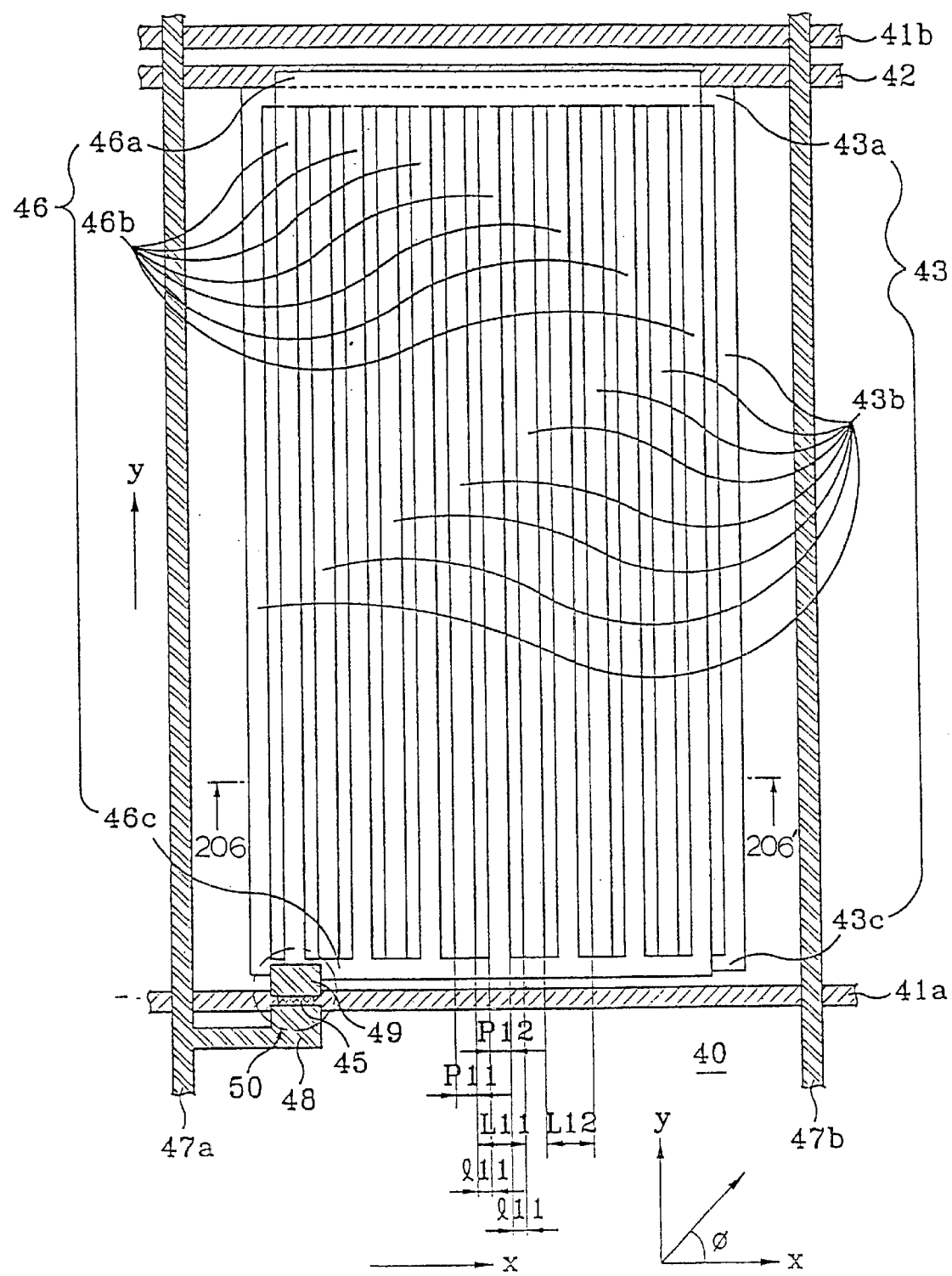
Figure 6:
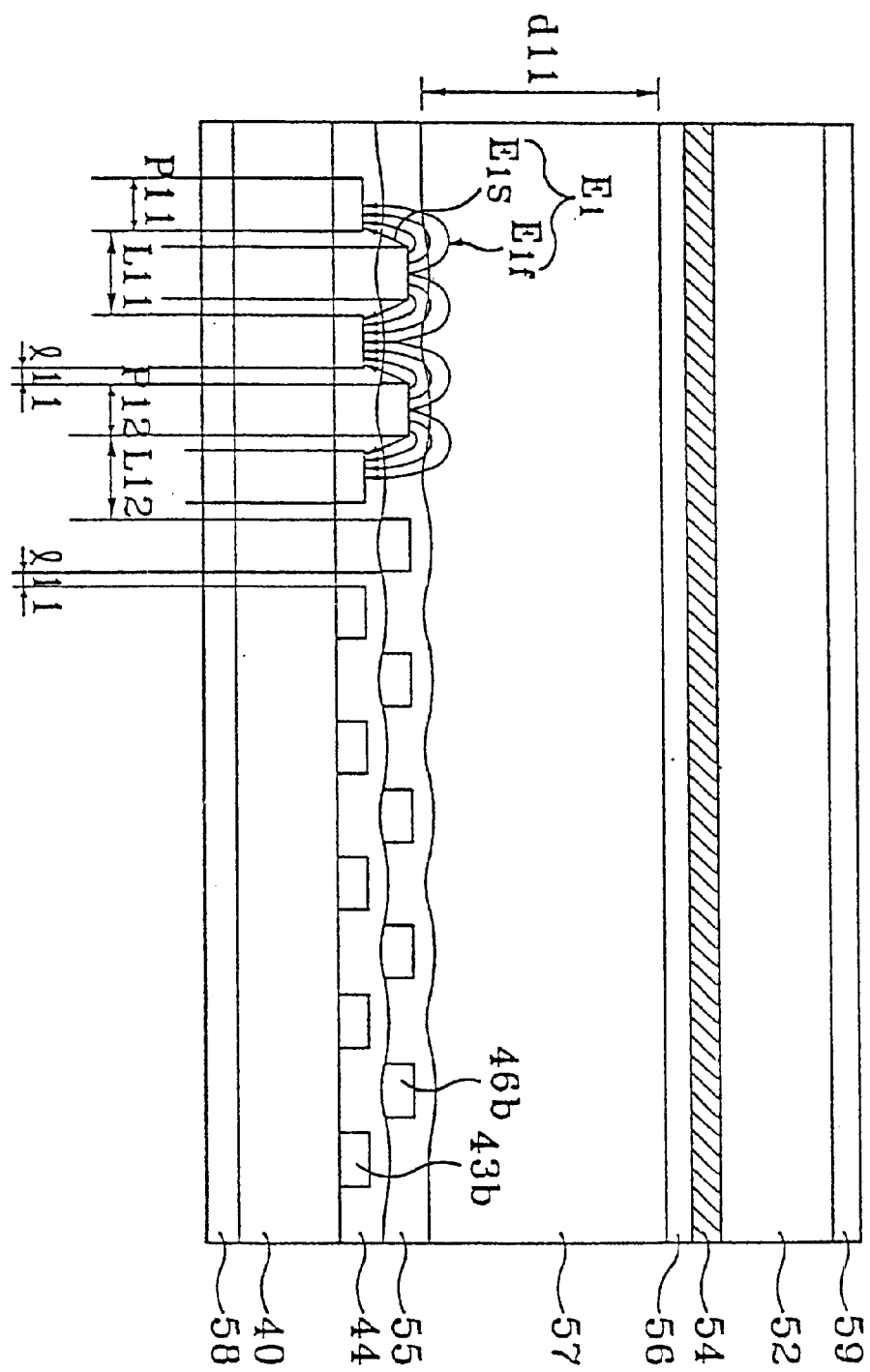
FIG. 6 is a simplified sectional view taken along the line 206–206' of FIGS. 5A and 5B.

Referring to FIG. 5A, FIG. 5B, and FIG. 6, a single pixel region and portions of adjacent pixel regions surrounding it, are illustrated. In a complete LCD display, rows of a number of gate bus lines and orthogonal columns of a number of data bus lines are arranged in a matrix configuration. Thus a pixel is formed in the regions bounded by these kinds of lines. That is, for example, a pair of gate bus lines 41a and 41b are arranged on a lower or first substrate 40 in the direction of x-axis so that they are spaced apart from each other with a selected distance. A pair of data bus lines 47a and 47b are also arranged on the first substrate 40 in the direction of y-axis so that they are spaced apart from each other with a selected distance. Thus, a unit pixel is defined as a region bounded by a pair of gate bus lines 41a and 41b and a pair of data bus lines 47a and 47b. The pair of gate bus lines 41a and 41b and the pair of data bus lines 47a and 47b are only shown in the drawings. The unit pixel region in the present embodiment 1 has almost the same size as in the conventional LCDs.

A gate insulating layer 44 is interposed between the gate bus lines 41a and 41b and the data bus lines 47a and 47b, to insulate them from each other. A common signal line 42 is arranged between the pair of gate bus lines 41a and 41b in the direction of x-axis to be parallel to the gate bus lines 41a and 41b. The common signal line 42 is also disposed to be closer to the previous gate bus line 41b rather than the other corresponding gate bus line 41a. Here, the gate bus lines 41a and 41b, the common signal line 42, and the data bus lines 47a and 47b are made of one element metal or alloy of at least two elements selected from the group consisting of Al, Mo, Ti, W, Ta, and Cr, in order to reduce RC delay time. The elements each has a good conductivity characteristics. In the present embodiment 1, MoW alloy is used as material for the signal lines.

A first or counter electrode 43 is formed within the unit pixel region of the first substrate 40 and is disposed on the same level plane that the gate bus line 41a and 41b. The counter electrode 43 is in contact with the common signal line 42, to thereby receive the common signal. The counter electrode 43 is made of transparent conductive material such as indium tin oxide("ITO").

The counter electrode 43 includes a body 43a and a plurality of strips 43b branched from the body 43a. The body 43a is arranged to be parallel to the gate bus lines 41a and 41b. The plurality of strips 43b are arranged to be extended in the direction of the inverse y-axis. More specifically, the counter electrode 43 has a comb structure whose one sided ends thereof are closed by the body 43a and the other sided ends are open. In the present embodiment 1, for example, the strips 43b is eight per a unit pixel region. The strips 43b each has a selected width P11 and is spaced apart from each other with a selected distance L11. The strips 43b each is formed to have the width P11 narrower than in the conventional devices, in view of relation with a pixel electrode which will be further formed.

A second or pixel electrode 46 is disposed in the unit pixel region of the first substrate 40. The pixel electrode 46 includes a body 46a and a plurality of strips 46b branched from the body 46a. The body 46a is arranged to be parallel to the gate bus lines 41a and 41b. The plurality of strips 46b are arranged to be extended in the direction of the inverse y-axis. More specifically, the pixel electrode 46 has a comb structure whose one sided ends thereof are closed by the body 43*a* and the other sided ends are open. In the present embodiment 1, for example, the strips 46*b* are seven per a unit pixel region. The strips 46*b* of the pixel electrode 46 are formed to alternate with the strips 43*b* of the counter electrode 43 with the intervention of a gate insulating layer 44 as shown in FIG. 6. The pixel electrode 46 is made of transparent conductive material such as ITO like the counter electrode 43. The body 46*a* of the pixel electrode 46 overlaps with the body 43*a* of the counter electrode 43. The strips 46*b* each has a selected width P12 and is spaced apart from each other with a selected distance L12. The strips 46*b* each is also arranged between the strips 43*b* of the counter electrode 43.

As shown in FIG. 5B, the counter electrode 43 has a structure where the two sided ends of the strips 43*b* thereof are bound by the respective corresponding bodies 43*a* and 43*c* which are parallel to the gate bus line 41*a*. The pixel electrode 46 has a structure where the two sided ends of the strips 46*b* thereof are also bound by the respective corresponding bodies which are parallel to the gate bus line 41*a*.

Although not shown in the drawings, at least one of two sided ends of the strips 43*b* may be connected to a body and at least one of two sided ends of the strips 46*b* may be also connected to a body.

In the present embodiment 1, the widths P12 of the strips 46*b* of the pixel electrode 46 are smaller than the distance L11 between the strips 43*b* of the counter electrode 43. Therefore, the strips 46*b* of the pixel electrode 46 each is disposed along the central portions of spaces between the strips 43*b* of the counter electrodes 43, and a distance between a strip 46*b* of the pixel electrode 46 and a strip 43*b* adjacent thereto is l11. Here, the distance l11 is smaller than the cell gap d11 between the first and second substrates as shown in FIG. 6. For example, when area of the unit pixel is about 110 $\mu$m×330 $\mu$m, the distance l11 is about 0.1 $\mu$m to about 5 $\mu$m. The strips 43*b* of the counter electrode 43 and the strips 46*b* of the pixel electrode 46 each has such a degree of widths to produce electric field by which all the liquid crystal molecules overlying the two electrodes can be aligned. For example, when the unit pixel region has an area of the unit pixel is about 110 $\mu$m×330 $\mu$m, the counter electrode 43 has eight strips 43*b*, and the pixel electrode 46 has seven strips 46*b*, the strips 43*b* and the strips 46*b* each has a width of about 1 to about 8 $\mu$m, preferably, 2 to 5 $\mu$m.

Meanwhile, depending on the size of the unit pixel and the numbers of the strips 43*b* and of the strips 46*b*, the widths of the strips 43*b* and of the strips 46*b* and the distance therebetween can be modified. However, it is noted in the present embodiment 1 that the strips of the electrodes each must be set to have such a range of the width that all the liquid crystal molecules overlying the electrodes 43 and 46 are substantially aligned. Preferably, the ratio of the width P11 of the strip 43*b* to the width P12 of the strip 46*b* must be set to be in a range of about 0.2 to about 4.0.

A thin film transistor("TFT") 50 used as a switching element, is formed on a crossing point of the gate bus line 41*a* and the data bus line 47*a*. The TFT 50 includes a channel layer 45 formed on the gate bus line 41*a*, a drain electrode 48 extending from the data bus line 47*a* and overlapped with one side of the channel layer 45 by a selected portion, and a source electrode 49 overlapped with the other side of the channel layer 45 by a selected portion and connected to the pixel electrode 46.

A storage capacitor Cst is formed at an overlapped portion of the counter and pixel electrodes 43 and 46. In the present embodiment 1, the storage capacitor Cst is formed at the overlapped portion of the body 43*a* of the counter electrode 43 and the body 46*a* of the pixel electrode 46. The storage capacitor Cst holds data signal at a desired voltage level during one frame.

Referring to FIG. 6, an upper or second substrate 52 is disposed opposite the first substrate 40 having the structure described above so that the first and second substrates 40 and 52 are spaced apart from each other with a selected cell gap d11. A color filter 54 is disposed on the inner surface of the second substrate 52.

A first alignment film 55 is disposed on the inner surface of the first substrate 40 and a second alignment film 56 is disposed on the inner surface of the second substrate 52. Each of the first and second alignment films 55 and 56 has a pretilt angle of zero degree to 10 degrees, and aligns liquid crystal molecules to a selected direction.

Figure 7A:
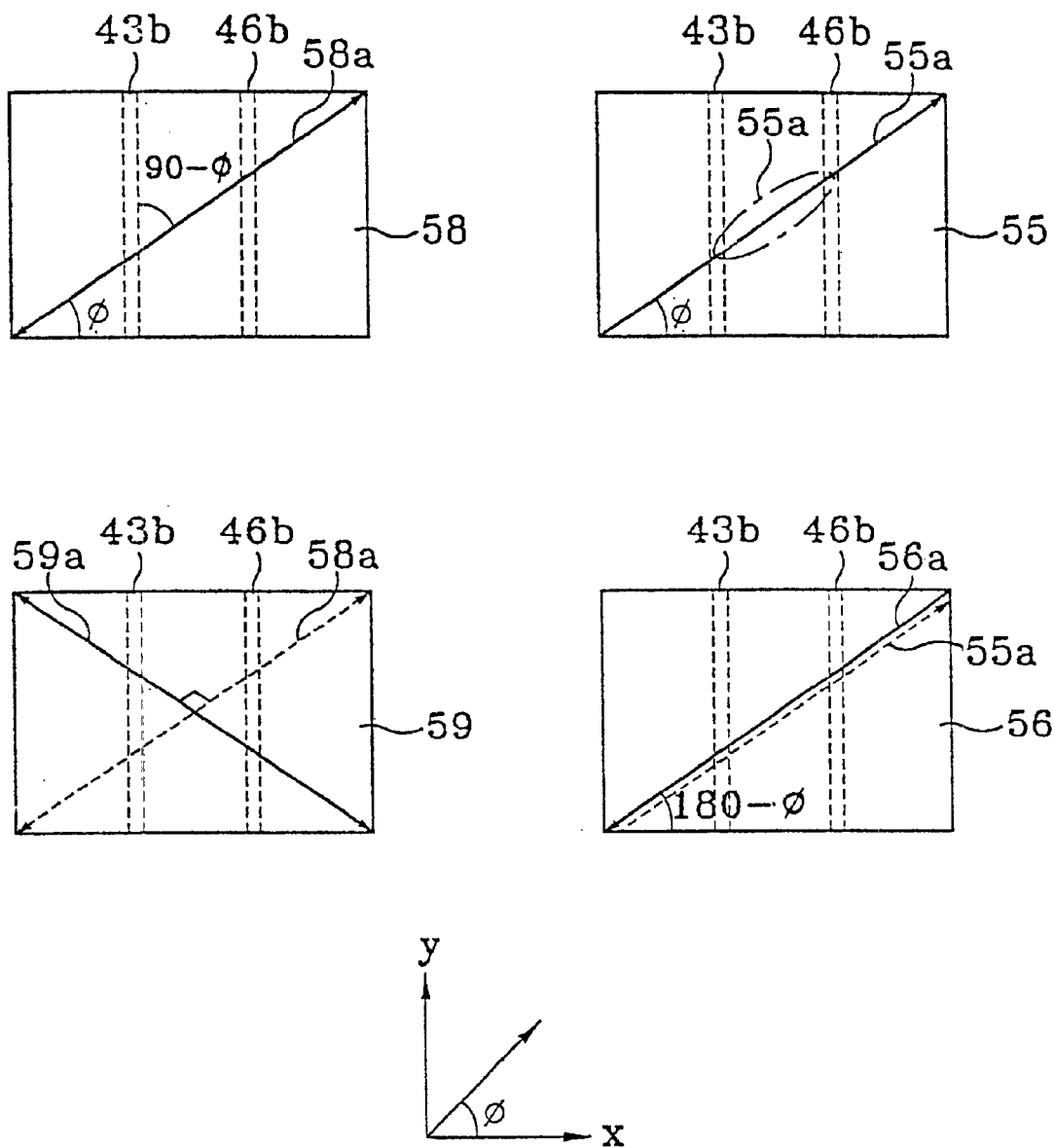
FIGS. 7A and 7B are simplified views showing the relations between the alignment directions of an upper and lower alignment layers and between the polarizing directions of a polarizer and a analyzer in the liquid crystal display according to embodiments of the present invention.

Referring to FIG. 7A, the first alignment film 55 is rubbed so that its rubbing direction makes an angle $\phi$ relative to the x-axis and the second alignment film 56 is also rubbed so that its rubbing direction makes an angle 180 degrees relative to the rubbing direction of the first alignment film 55.

Returning to the FIG. 6, a liquid crystal layer 57 comprising a plurality of molecules of a rod shape is interposed between the first and second alignment films 55 and 56. The liquid crystal layer 57 is nematic liquid crystal and has a twistable structure. The anisotropy of the refractive index $\Delta n$ of the liquid crystal 57 is set so that a product of the refractive index $\Delta n$ thereof and the cell gap d11 is in a range of about 0.2 to about 0.6 $\mu$m. The dielectric anisotropy $\Delta \in$ of the liquid crystal 57 is determined by the angle which the rubbing axis of the first alignment film 55 makes with the x-axis. Details for a determination of the dielectric anisotropy $\Delta \in$ will be explained later.

A polarizer 58 and an analyzer 59 are arranged on the outer surfaces of the first and second substrates 40 and 52, respectively. The polarizer 58 is optically related to the liquid crystal 57 and the analyzer 59 is optically related to the polarizer 58. As shown in FIG. 7A, a polarizing axis 58*a* of the polarizer 58 and an absorbing axis 59*a* of the analyzer 59 are orthogonal to each other. Here, the polarizing and absorbing axes serve to transmit only light beam oscillating in parallel with the axis directions.

The relation among the polarizing axis 58*a* of the polarizer 58, the absorbing axis 59*a* of the analyzer 59, and the rubbing axes 55*a* and 56*a* of the first and second alignment films 55 and 56, will be explained in more detail with reference to FIG. 7A and FIG. 7B.

Referring to FIG. 7A, an angle between the polarizing axis 58*a* of the polarizer 58 and the x-axis is $\phi$ and an angle between the polarizing axis 58*a* of the polarizer 58 and a longitudinal direction(equal to the y-axis direction) of the electrodes 43*b* and 46*b* is 90-$\phi$. The absorbing axis 59*a* of the analyzer 59 and the polarizing axis 58*a* of the polarizer 58 are orthogonal to each other. The first alignment film 55 is rubbed so that its rubbing axis 55*a* substantially coincides with the polarizing axis 58*a* of the polarizer 58. The second alignment film 56 is rubbed such that its rubbing direction 56*a* differs by 180 degrees from the rubbing axis 55*a* of the first alignment film 55. This indicates that the first and second alignment films 55 and 56 are rubbed in the opposite directions each other.

Figure 7B:
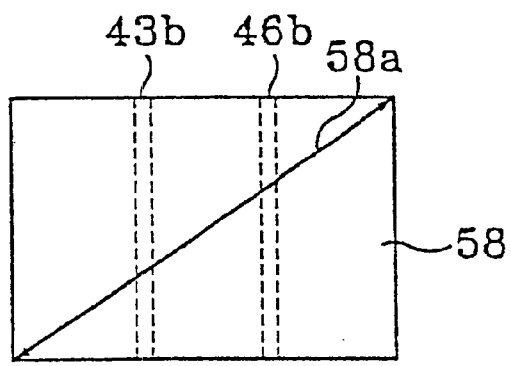
Figure 7B:
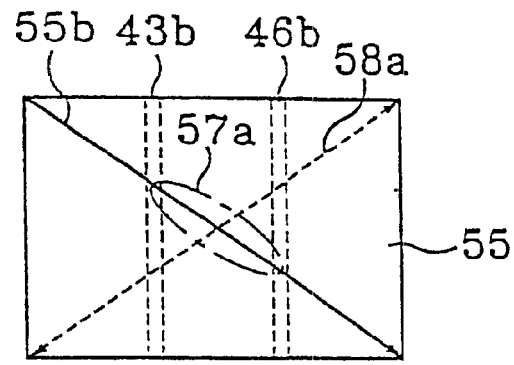
Figure 7B:
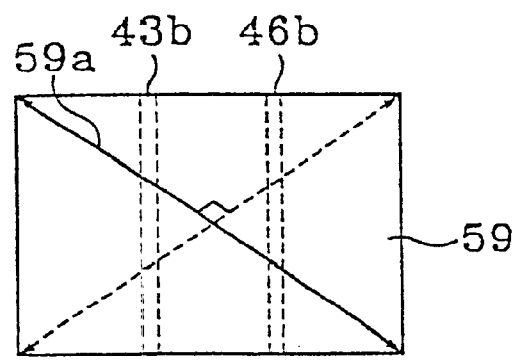
Figure 7B:
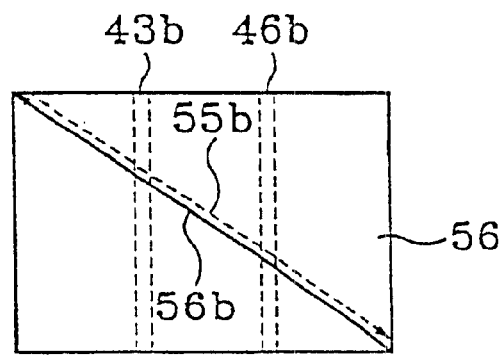
Figure 7B:
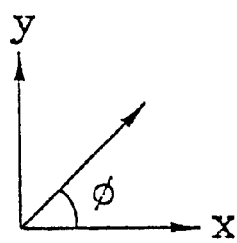

On the other hand, as shown in FIG. 7B, the rubbing axis 55*b* of the first alignment film 55 can be made to be orthogonal to the polarizing axis 58*a* of the polarizer 58 but to be parallel to the absorbing axis 59*a* of the analyzer 59. Here, the polarizing axis 58*a* of the polarizer 58 and the absorbing axis 59a of the analyzer 59 have the same direction as those of FIG. 7A. At this time, the rubbing axis 56a of the second alignment film 56 differs by 180 degrees from the rubbing axis 55b of the first alignment film 55.

As the liquid crystal layer 58, a negative liquid crystal with negative dielectric anisotropy or a positive liquid crystal with positive dielectric anisotropy can be alternatively used. When the negative liquid crystal is used, the liquid crystal molecules are arranged such that their longer axes are orthogonal to the electric field direction applied. While when the positive liquid crystal is used, the liquid crystal molecules are arranged such that their longer axes are parallel to the electric field applied.

When a liquid crystal display has the configuration of FIG. 7A and the rubbing axis 55a of the first alignment film 55 makes an angle of 0 degree to 45 degrees with the x-axis, the negative liquid crystal layer is used. While, when a liquid crystal display has the configuration of FIG. 7A and the rubbing axis 55a of the first alignment layer 55 makes an angle of 45 degrees to 90 degrees with the direction of x-axis, the positive liquid crystal is used. Therefore, to obtain maximum transmittance, a liquid crystal layer with a suitable value of dielectric anisotropy is selected according to the rubbing axes of the alignment layers.

Details will be explained with reference to the following equation.

$$T \approx T_0 \sin^2(2\chi) \cdot \sin^2(\pi \cdot \Delta nd/\lambda) \quad \text{Eq. 1}$$

where T is a transmittance, $T_0$ is the transmittance with respect to reference light, $\chi$ is an angle between the optical axis of the liquid crystal molecule and the polarizing axis of the polarizer, d is a cell gap or a distance between the first and second substrates or is the thickness of the liquid crystal layer, and $\lambda$ is a wavelength of incident light.

According to the Eq. 1, in case the angle $\chi$ is $\pi/4$(45 degrees) and $\Delta nd/\lambda$ is 1/2, the transmittance is maximum. Therefore, to insure maximum transmittance, $\Delta nd$ of the liquid crystal. molecule used should be $\lambda/2$ and the optical axis of the liquid crystal molecule 57a must deviate by an angle of about 45 degrees from the polarizing axis 58a of the polarizer 58.

When an angle $\phi$ between the rubbing axis 55a of the first alignment film 55 and the electric field direction, i.e., the x-axis direction is 45 degrees or less, if the positive liquid crystal is used, the optical axis of the liquid crystal molecule 57a deviates within about 45 degrees from the polarizing axis 58a of the polarizer 58 in the presence of the electric field. Accordingly, it is often difficult to insure maximum transmittance. On the other hand, if the negative liquid crystal is used, the optical axis of the liquid crystal molecule 57a deviates by an angle of about 90-$\phi$ from the polarizing axis 58a of the polarizer 58 in the presence of the electric field and therefore the transmittance T becomes maximum.

Furthermore, when the angle $\phi$ between the rubbing axis 55a of the first alignment film 55 and the field direction, i.e., the x-axis direction is 45 degrees or more, if the positive liquid crystal is used, the optical axis of the liquid crystal molecule 57a deviates by an angle about 45 degrees or more from the polarizing axis 58a of the polarizer 58 in the presence of the electric field and therefore the transmittance T is maximum. While if the negative liquid crystal is used, the optical axis of the liquid crystal molecule 57a deviates within an angle of about 90-$\phi$ from the polarizing axis 58a of the polarizer 58 in the presence of the field. Accordingly, it is often difficult to insure maximum transmittance.

Moreover, when the angle $\phi$ is 30 degrees, if the positive liquid crystal is used, the liquid crystal molecules are arranged such that their longer axes are parallel to the field direction in the presence of the field. Therefore, the optical axis of the liquid crystal molecule deviates by an angle 30 degree from the polarizing axis 58a of the polarizer 58. As a result, the transmittance T does not approach maximum in the presence of the electric field. On the other hand, when the angle $\phi$ is 30 degrees, if the negative liquid crystal is used, the liquid crystal molecules are arranged such that their longer axes are orthogonal to the electric field direction. Therefore the optical axis of the liquid crystal molecule deviates by an angle of 60 degree from the polarizing axis 58a of the polarizer 58. In the presence of the electric field, the liquid crystal molecules are twisted to 60 degrees through a region where the angle $\phi$ between the optical axis of the liquid crystal molecule and the polarizing axis of the polarizer is 45 degrees.

Hereinafter, a method of manufacturing the above liquid crystal display will be explained.

Figure 8A:
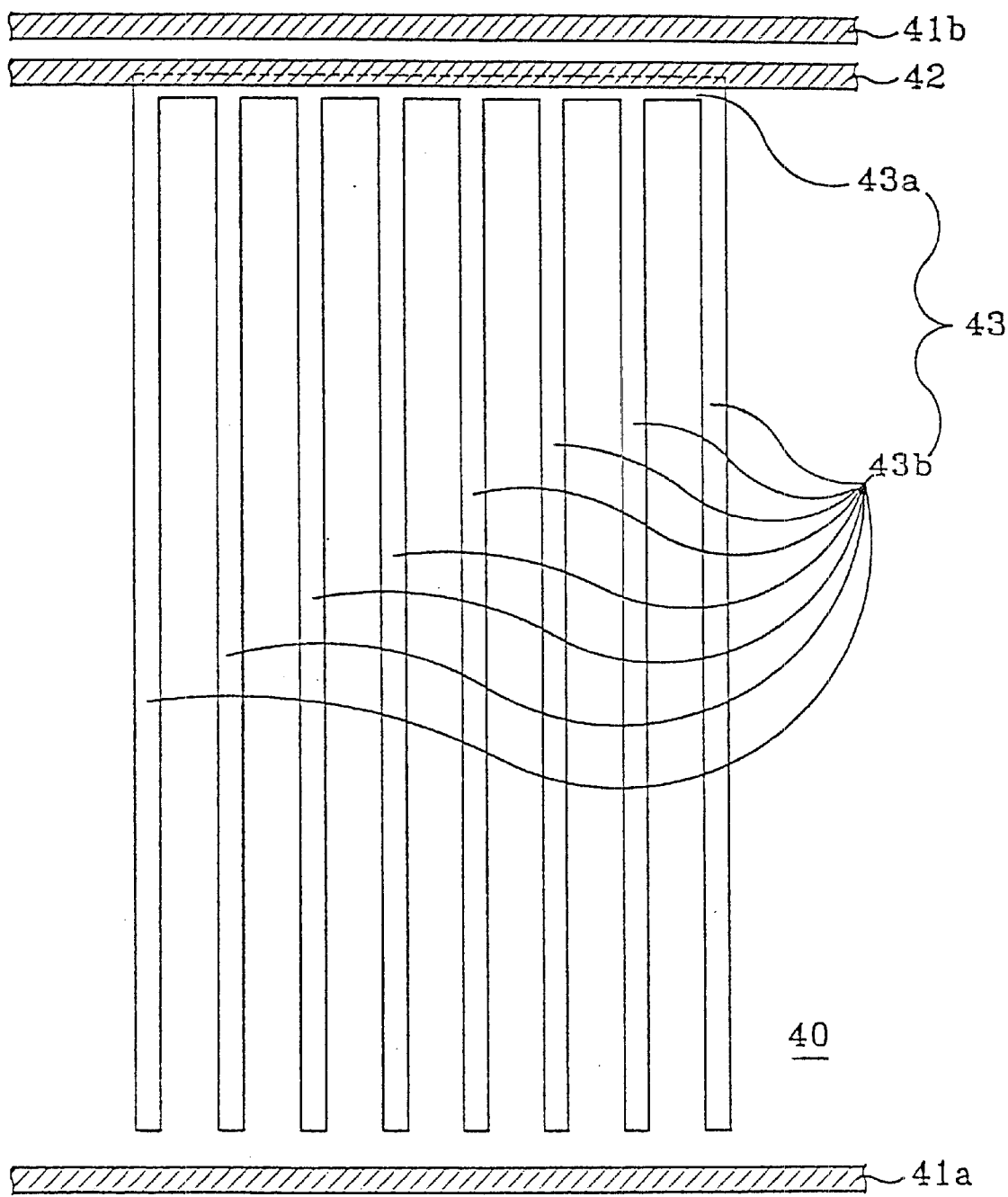
FIGS. 8A to 8C are simplified views showing the method for fabricating the liquid crystal display according to embodiments of the present invention.

Referring to FIG. 8A, a transparent metal layer(not shown) such as ITO is formed on the first substrate 40 to a thickness of 400–1,000 Angstroms. Here, the first substrate 40 is a transparent glass substrate and may comprise a passivation layer thereon. A metal layer, preferably, MoW layer is then formed on the ITO layer to the thickness of 2,500–3,500 Angstroms. Thereafter, the metal layer is patterned by the widely-known photolithography technique, thereby to form a plurality of gate bus lines 41a and 41b and a common signal line 42. After the completion of the photolithography process, the previously deposited ITO layer is exposed at portions except places where the gate bus lines 41a and 41b, and the common signal line 42 are disposed. The exposed ITO layer is patterned to a comb structure having a body 43a and a plurality of strips 43b, thereby to form a counter electrode 43. The counter electrode 43 is formed so that its strips 43b each has a selected width and are spaced apart from each other with a selected distance and its body portion 43a is in contact with the common signal line 42.

Although not shown in the drawings, various methods for forming the counter electrode, the gate bus lines, the common signal line can be used.

For example, the counter electrode 43 is first formed by depositing ITO on the first substrate and then patterning. Afterwards, the gate bus lines 41a and 41b, and the common signal line 42 are formed by depositing MoW on the resultant structure including the counter electrode and then patterning.

According to another example, the gate bus lines 41a and 41b, and the common signal line 42 are first formed by depositing MoW on the first substrate 40 and then patterning. Afterwards, the counter electrode 43 is formed by depositing ITO on the resultant structure including the gate bus lines 41a and 41b, and the common signal line 42.

Figure 8B:
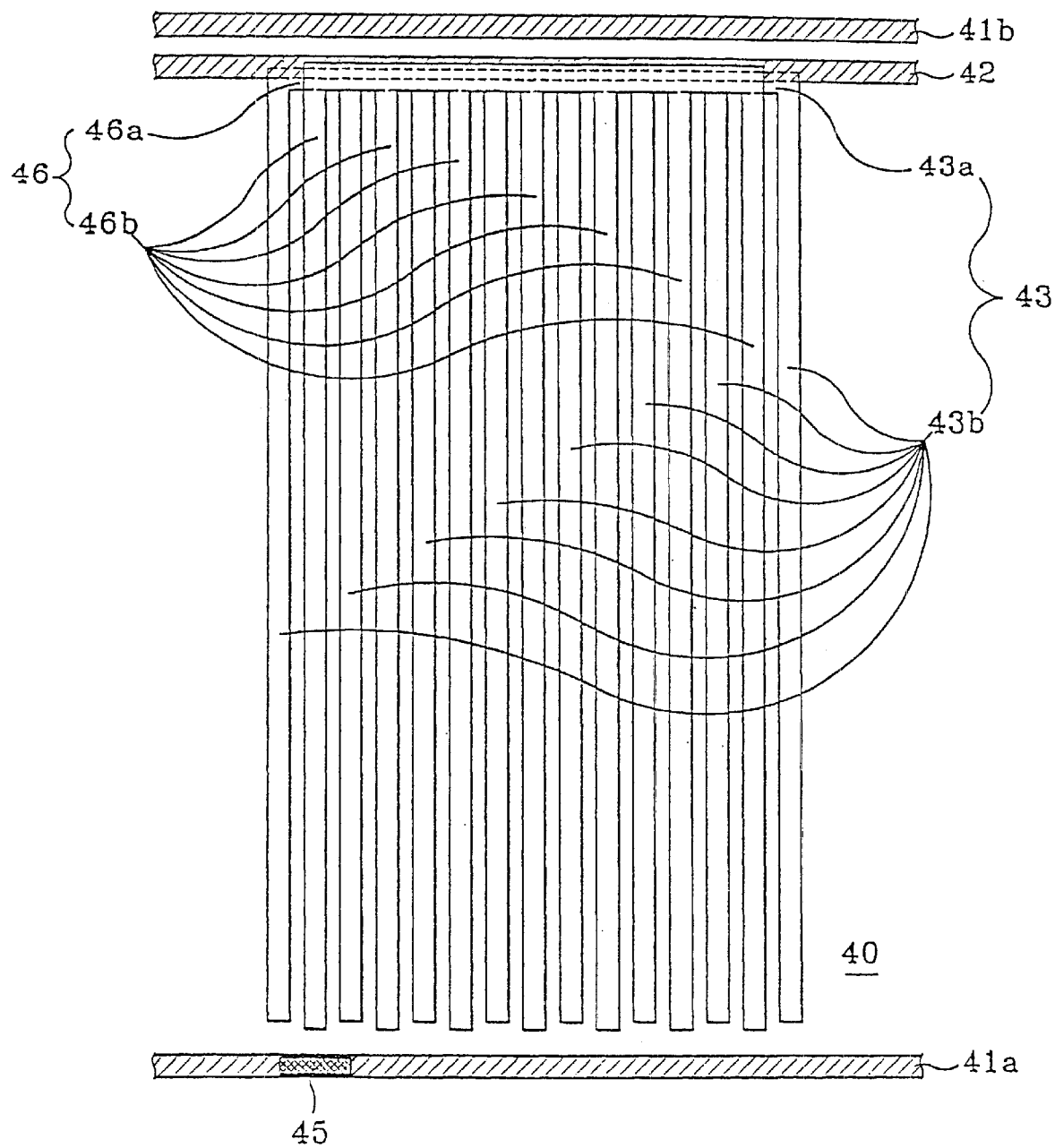

Referring to FIG. 8B, a gate insulating layer(not shown) is deposited on the resultant structure of the first substrate 40. The gate insulating layer is made of one material selected from the group consisting of silicon oxide layer, silicon nitride layer, the stacked layers of silicon oxide layer and silicon nitride layer, and metal oxide layer.

Next, a semiconductor layer is deposited on the resultant structure of the first substrate 40 and patterned to form a channel layer 45. The semiconductor layer is made of one material selected from the group consisting of single crystal silicon layer, amorphous silicon layer, and polycrystalline silicon layer. Afterwards, a transparent conductive material such as ITO is deposited on the gate insulating layer(not shown) of the first substrate 40 to the thickness of 400–1,000

Angstroms and then patterned, to form a pixel electrode 46 comprising a body 46a and a plurality of strips 46b normal to and extending from the body 46a. The body 46a of the pixel electrode 46 is in contact with the counter electrode 43 and the strips 46b are placed between the strips. 43b of the counter electrode 43.

Figure 8C:
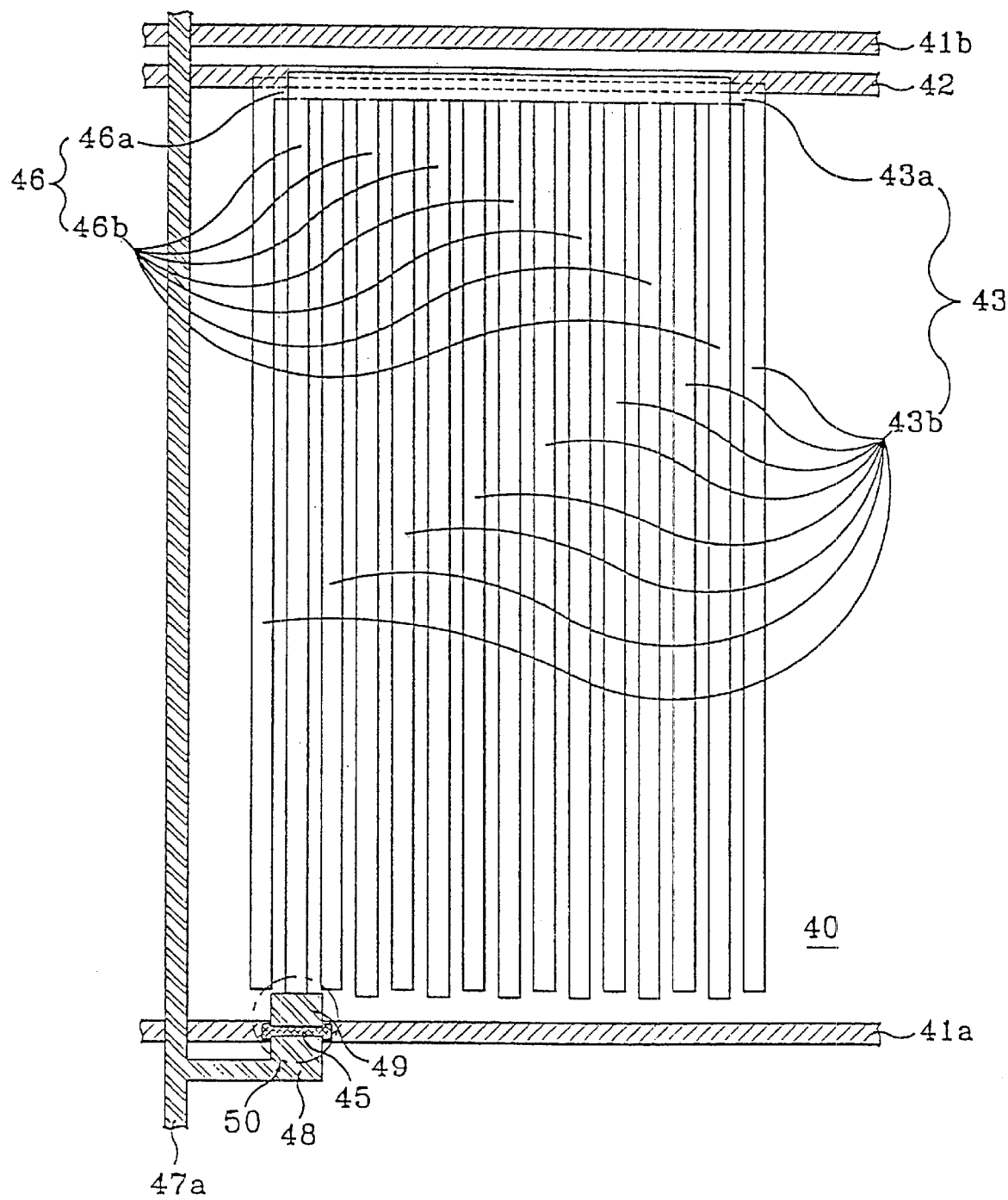

Referring to FIG. 8C, an opaque metal layer is formed on the structure of FIG. 8B to the thickness of 4,000–4,500 Angstroms and patterned by the widely-known photolithography technique, thereby to form a plurality of data bus lines 47a, drains 48, and sources 49, whereby a TFT 50 is formed. Here, the metal layer are made of one element or alloy of at least two elements selected from the group consisting of Al, Mo, Ti, W, Ta, and Cr. It is preferable that the counter and pixel electrodes 43 and 46 each is thinner in thickness than those of the conventional devices because each of the counter and pixel electrodes 43 and 46 is not simultaneously formed with each of the gate bus lines 41a and 41b, and the data bus lines 47a and 47b. This provides an advantage that an additional planarization process is not required.

Although not shown in the drawings, a first alignment film with a pretilt angle of 10 degrees or less is formed on the resultant structure of the first substrate 40. The first alignment film is homogeneous alignment film which aligns the liquid crystal molecules parallel with the surface of the first alignment film.

A second or upper substrate on which a color filter is formed, is also provided. On the resultant upper substrate is formed a second alignment film with a pretilt angle of 10 degrees or less. The second alignment film used is also homogeneous alignment film. Thereafter, the first and second alignment films are rubbed in a selected direction so that liquid crystal molecules have a pretilt angle of 10 degrees or less. The second substrate is attached to the first substrate 40 with a selected cell gap so that the alignment films of the first and second substrates are opposite to each other. A liquid crystal is then filled in a space between the first and second alignment layers of the two substrates.

Next, operation of the above liquid crystal display will be explained with reference to the accompanying drawings.

When the gate bus line 41a is not selected, electric field is not produced between the counter and pixel electrodes 43 and 46b since no signals are applied to the pixel electrode 46. Thus, incident light passing through the polarizer 58 does not pass the liquid crystal layer. The reason is as follows.

Figure 9A:
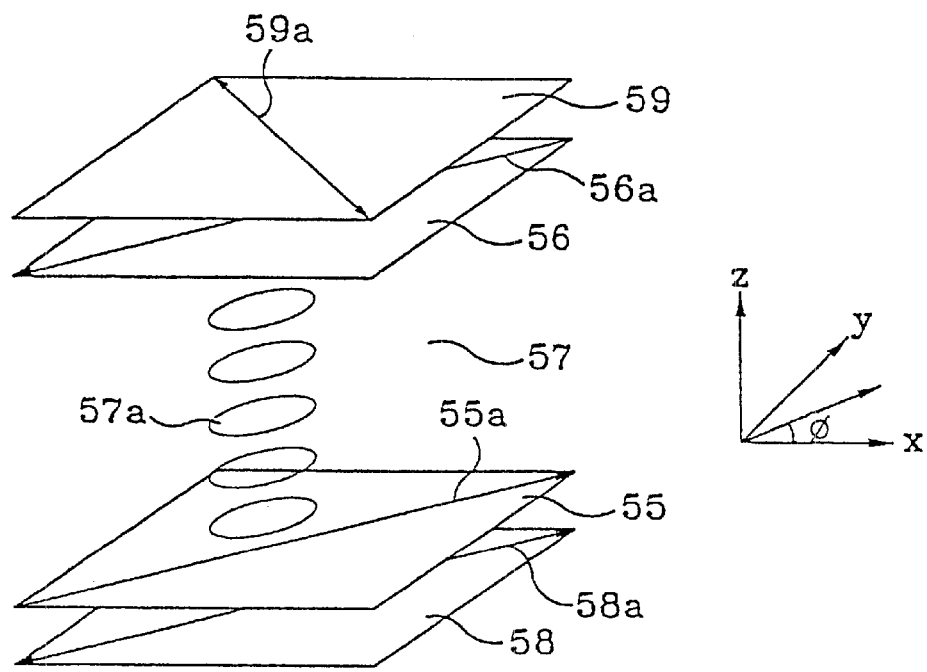
FIG. 9A is a simplified perspective view showing the alignment of the liquid crystal molecules in an absence of the electric field in the liquid crystal display according to embodiments of the present invention.

Referring to FIGS. 7A and 9A, in case the polarizing axis 58a of the polarizer 58 and the absorbing axis 59a of the analyzer 59 are orthogonal to each other, the polarizing axis 58a of the polarizer 58 and the rubbing axis 55a of the first alignment film 55 are parallel to each other, and the rubbing axis 56a of the second alignment film 56 obviates by 180 degrees from the rubbing axis 55a of the first alignment film 55, the liquid crystal molecules 57a are arranged parallel to the rubbing axes 55a and 56a of the first and second alignment films 55 and 56 in an absence of the electric field. At this time, incident light beams are linearly polarized after the passing of the polarizer 58. The linearly polarized light beams do not change their polarized state in the passing of the liquid crystal layer 57 since their oscillation directions coincide with the longer axes of the liquid crystal molecules. As widely known to a skilled person, when an oscillation direction of linearly polarized light beams coincides with the optical axis of the liquid crystal molecules, their polarization state does not change. Therefore, such a result indicates that the longer axis of the liquid crystal molecules 57a coincides with the optical axis of the liquid crystal molecules. The light beams passing through the liquid crystal layer 57 is incident to the analyzer 59 but does not pass the analyzer 59 because the absorbing axis 59a of the analyzer 59 makes 90 degrees relative to the oscillation direction of the light beams after the passing the liquid crystal layer. Therefore, dark state is shown in the display.

Figure 9B:
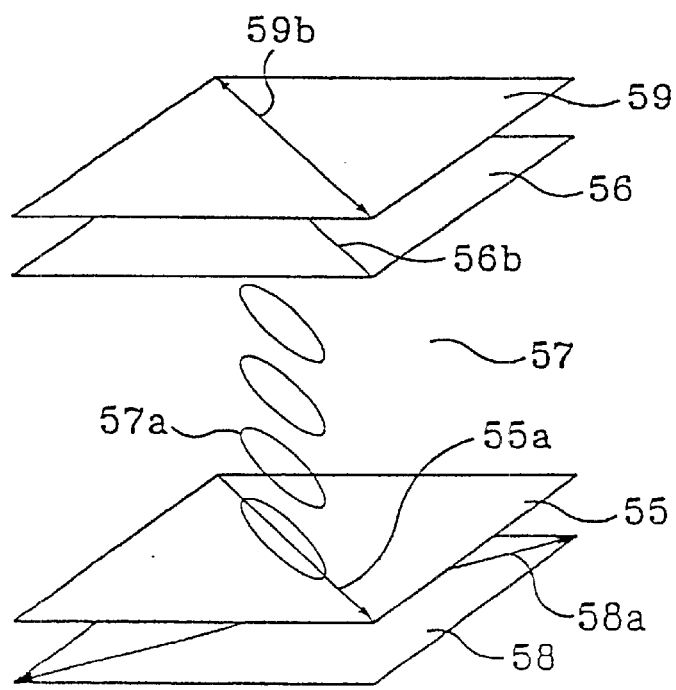
FIG. 9B is a simplified perspective view showing the alignment of the liquid crystal molecules in the presence of the electric field in the liquid crystal display according to embodiments of the present invention.

Meanwhile, referring to FIGS. 7B and 9B, in case the polarizing axis 58a of the polarizer 58 and the absorbing axis 59a of the analyzer 59 are orthogonal to each other, the polarizing axis 58a of the polarizer 58 and the rubbing axis 55a of the first alignment film 55 are orthogonal to each other, and the rubbing axis 56a of the second alignment film 56 differs by 180 degrees from the rubbing axis 55a of the first alignment film 55, the liquid crystal molecules 57a are arranged parallel to the rubbing axes 55a and 56a of the first and second alignment films 55 and 56 in an absence of the electric field. At this time, incident light beams are linearly polarized after the passing of the polarizer 58. The linearly polarized light beams do not change their polarized state since their oscillation direction coincides with the shorter axis of the liquid crystal molecules during the passing of the liquid crystal layer 57. This indicates that the shorter axis of the liquid crystal molecules 57a also coincides with the optical axis of the liquid crystal molecules. The light beams passing through the liquid crystal layer 57 are incident to the analyzer 59 but does not pass the analyzer 59 because the absorbing axis 59a of the analyzer 59 makes 90 degrees relative to the oscillation direction of the light beams after the passing the liquid crystal layer. Therefore, dark state is also shown in the display.

On the other hand, referring to FIG. 5A or FIG. 5B, when a scanning signal is applied to the gate bus line 41a and a display signal is applied to the data bus line 47a, the TFT 50 is turned on and therefore the display signal is applied to the pixel electrode 46. At this time, since a common signal continues to be applied to the counter electrode 43, electric field is produced between the counter and pixel electrodes 43 and 46. The electric field is substantially produced between the strips 43b of the counter electrode 43 and the strips 46b of the pixel electrode 46.

Figure 10:
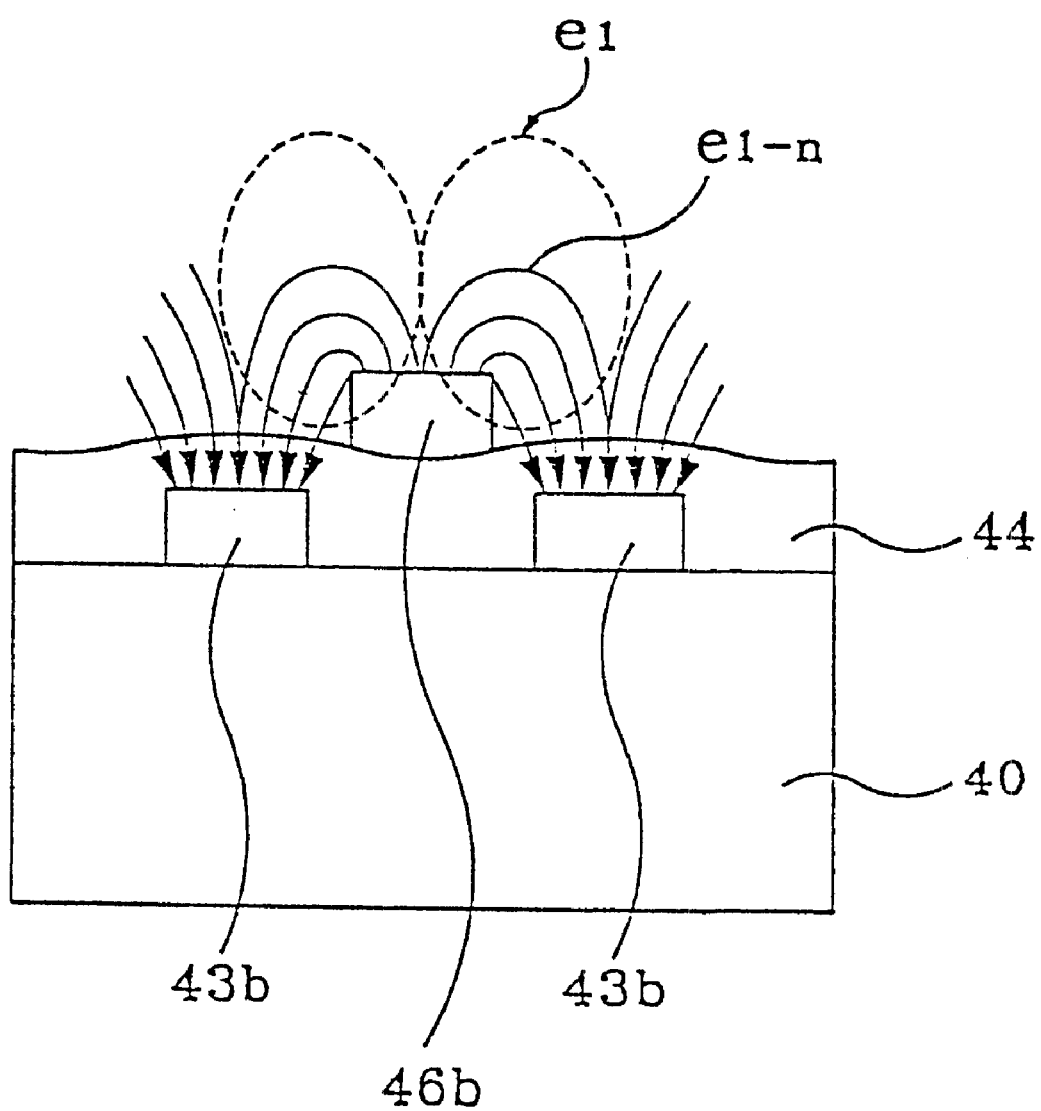
FIG. 10 is a simplified schematic diagram for schematically showing the distribution of the electric force lines in the liquid crystal display according to embodiments of the present invention.

As described above, the distance l11 between the strips 43b of the counter electrode 43 and the strips 46b of the pixel electrode 46 is narrower than that in the conventional devices. Therefore, as shown in FIG. 6, an electric field including of a small number of linear field lines. E1s and a larger number of parabolic field lines E1f having high curvature, is induced. Here, the small number of linear field lines E1s are generated only in edge regions of the upper surfaces between the strips 43b and the strips 46b adjacent thereto, having the different heights each other from the inner surface of the first substrate 40. The large number of parabolic field lines E1f are generated in major regions of the upper surfaces of each of the strips 43b and 46b. Since the parabolic electric field lines E1f affect liquid crystal molecules on almost all the upper surfaces of the strips 43b and 46b as well as between the adjacent strips 43b and 46b, almost all the liquid crystal molecules overlying all the strips of the electrodes, that is, substantially all the liquid crystal molecules within the liquid crystal layer, are aligned along the directions of the parabolic electric field lines E1f in the presence of the field. The reason that substantially all the liquid crystal molecules are oriented by the electric field is that the widths of the strips are narrower and the-distance between the strips is shorter, compared to the conventional LCDs, resulting in the generation of the parabolic electric field in even the central region of the upper surfaces of the strips. In further detail, as shown in FIG. 10, since the widths of the strip 43b of the counter electrodes 43, and the distance between the strip 43b thereof and the strip 46b of the pixel electrode 46 are narrow and short enough to such a degree that even the outmost field line el-n of the field lines el produced between the counter electrode 43b and left-sided pixel electrode 46b thereof is in a form of parabolic curve having a high curvature, even the liquid crystal molecules overlying the central regions of the upper surfaces of the strips of the electrodes are enough aligned under the influence of the electric field, which is different from in the conventional LCDs where the widths of the strips of electrodes and the distance between the adjacent strips of the electrodes are wide and long.

In case an angle between the polarizing axis 55a and the field direction is in a range of zero degrees to 90 degrees, the liquid crystal molecules 57a are twisted so that their longer axes are orthogonal or parallel to the field direction, and thus incident light beams transmit. Such a result becomes apparent from the Eq. 1 showing a variation in transmittance according to the value of $\chi$ which is an angle between the optical axes of the liquid crystal molecules and the polarizing axis of the polarizer.

Furthermore, since liquid crystal of either positive or negative dielectric anisotropy is selected in view of the angle $\phi$ between the rubbing axis of the alignment film and the field direction, the present liquid crystal display shows maximum transmittance.

Meanwhile, to obtain a threshold voltage lower than that of the conventional devices, the distance l11 between the counter and pixel electrodes is made to be smaller than the cell gap d as shown in FIGS. 5A, 5B, and 6. The threshold voltage is defined as the following equation 2.

$$V_{th} = \pi l/d(K2/\epsilon_0 \Delta\epsilon)^{1/2} \qquad \text{Eq. 2,}$$

where $V_{th}$ is the threshold voltage, l is the distance between electrodes, d is the cell gap, K2 is the twist elastic coefficient, $\epsilon_0$ is the dielectric constant, and $\Delta\epsilon$ is the dielectric anisotropy.

According to the present embodiments, since the value of the l/d in Eq. 1 is reduced relative to that of the conventional devices, the threshold voltage $V_{th}$ is also substantially reduced.

Figure 11:
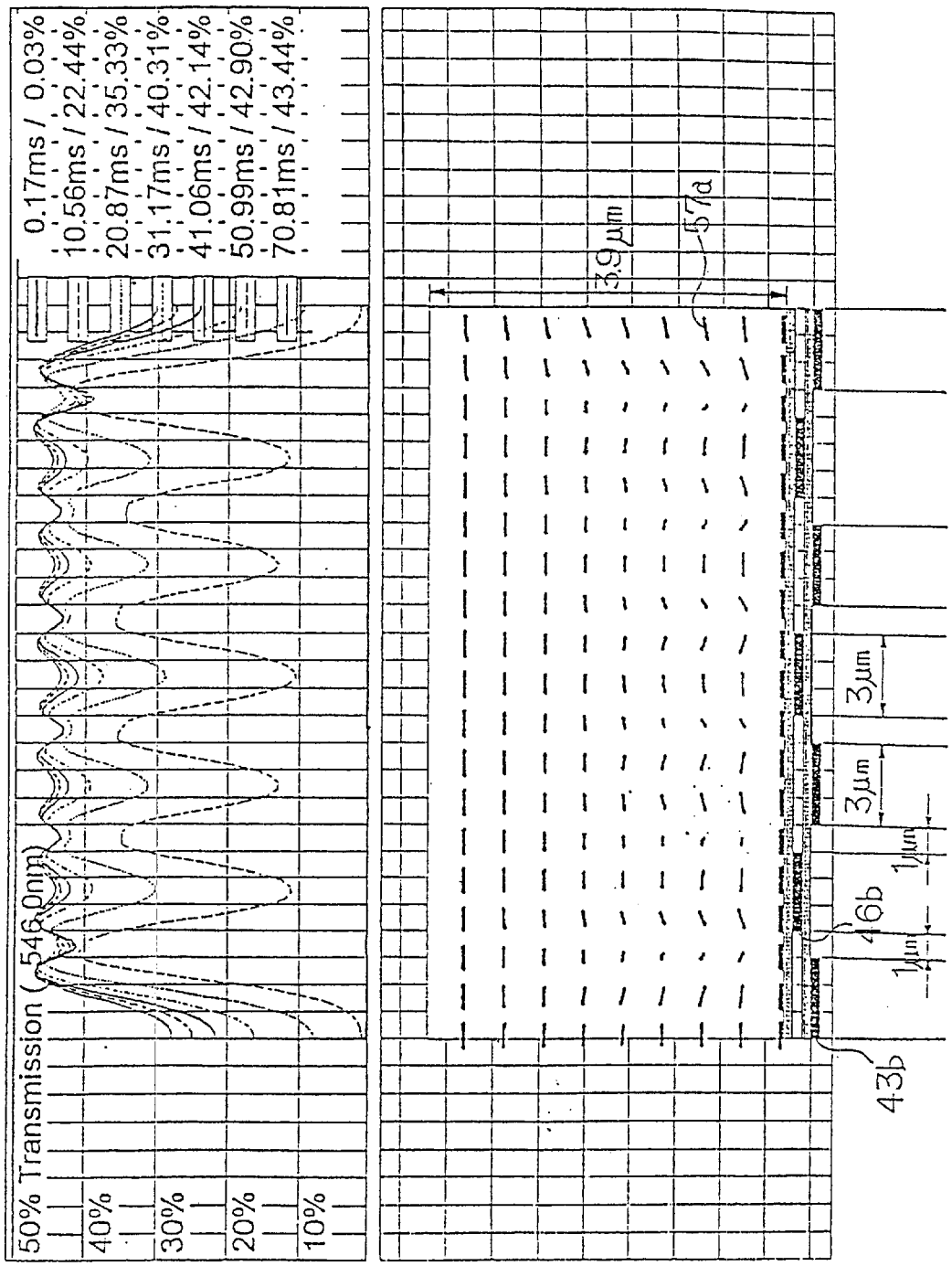
FIGS. 11 and 12 shows simplified simulation results of the transmittance variation according to the lapse of time after the application of an electric field in the unit pixel region of the liquid crystal display according to embodiments of the present invention.

FIG. 11 is a simplified simulation result of the liquid crystal displays according to the present embodiment 1 of the invention, and shows the behavior of the liquid crystal molecules and the transmittance variation in the presence of the electric field. Referring to FIG. 11, FIGS. 5A and 5B, and FIG. 6, the width P11 of the strip 43b of the counter electrode 43 and the width P12 of the strip 46b of the pixel electrode 46 are both 3 $\mu$m, the distance l11 between the strips 43b of the counter electrode 43 and the strips 46b of the pixel electrode 46 is 1 $\mu$m, the cell gap d is 3.9 $\mu$m, the pretilt angle is 2 degrees, the angle between the rubbing axis 55a of the first alignment film 55, the field direction(x-axis) is 12 degrees and the dielectric anisotropy $\Delta\epsilon$ of the liquid crystal 57 is −4, $\Delta$nd is 0.29, light wavelength $\lambda$ is 546 nm, and operation voltage is 6 V. In the FIG. 11, reference numeral 57a designates liquid crystal molecules.

As shown in FIG. 11, since the liquid crystal molecules above the strips 43b and 46b as well as the liquid crystal molecules therebetween are aligned, uniform transmittance is shown at all the regions. When the voltage is applied to the pixel electrode 46b, the transmittance is saturated after the lapse of 31.17 ms to reach about 40.31%. Thus, the transmittance of the liquid crystal display in the present invention is higher than that in the conventional devices during the same time period. In addition, since the present liquid crystal displays are short in the time which reach the same transmittance than the conventional LCDS, response time becomes also faster compared with that of the conventional devices.

Furthermore, the present invention makes it possible to drive the present liquid crystal display by a relatively low voltage.

Figure 12:
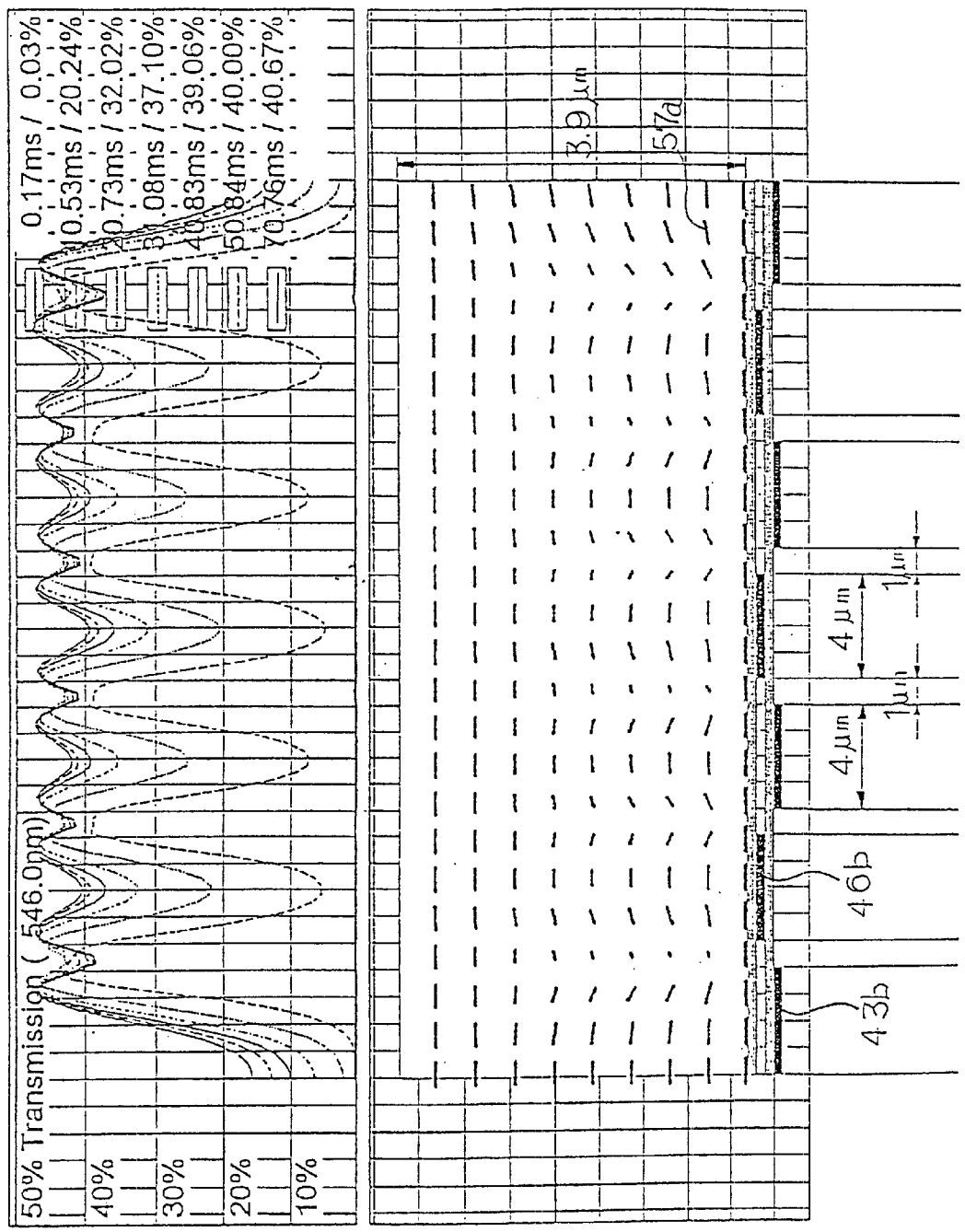

FIG. 12 shows a simplified simulation result of the liquid crystal displays according to the present embodiment 1 of the invention and is different from FIG. 11 in that the width P11 of the strips 43b of the counter electrode 43 and the width P12 of the strips 46b of the pixel electrode 46 are both 4 $\mu$m.

Similarly with the result shown in FIG. 11, uniform transmittance is shown at all the regions. When a necessary voltage is applied to the pixel electrode 46b, transmittance is saturated after the lapse of 31.08 ms to reach about 37.10%. Thus, the transmittance of the liquid crystal display in the present invention is higher than that in the conventional devices during the same time period. As a result, the response time of the present invention becomes faster than that of the conventional devices. The improved response time in these embodiments is due to the following reasons.

First reason is that distance of the linear electric field lines produced in the form of a straight line between the strips 43b and 46b is markedly shortened and accordingly intensity of the electric field is increased. Second reason is that the distance between the electrodes is shortened and accordingly the electric field lines produced in the form of parabola have curvature higher and radius smaller than those of the conventional devices, to thereby substantially align the liquid crystal molecules above the electrodes.

Therefore, it is noted that from the comparison between FIG. 11 and FIG. 12, the transmittance and response time of the liquid crystal display are improved as the widths of the electrodes are narrower.

Figure 13:
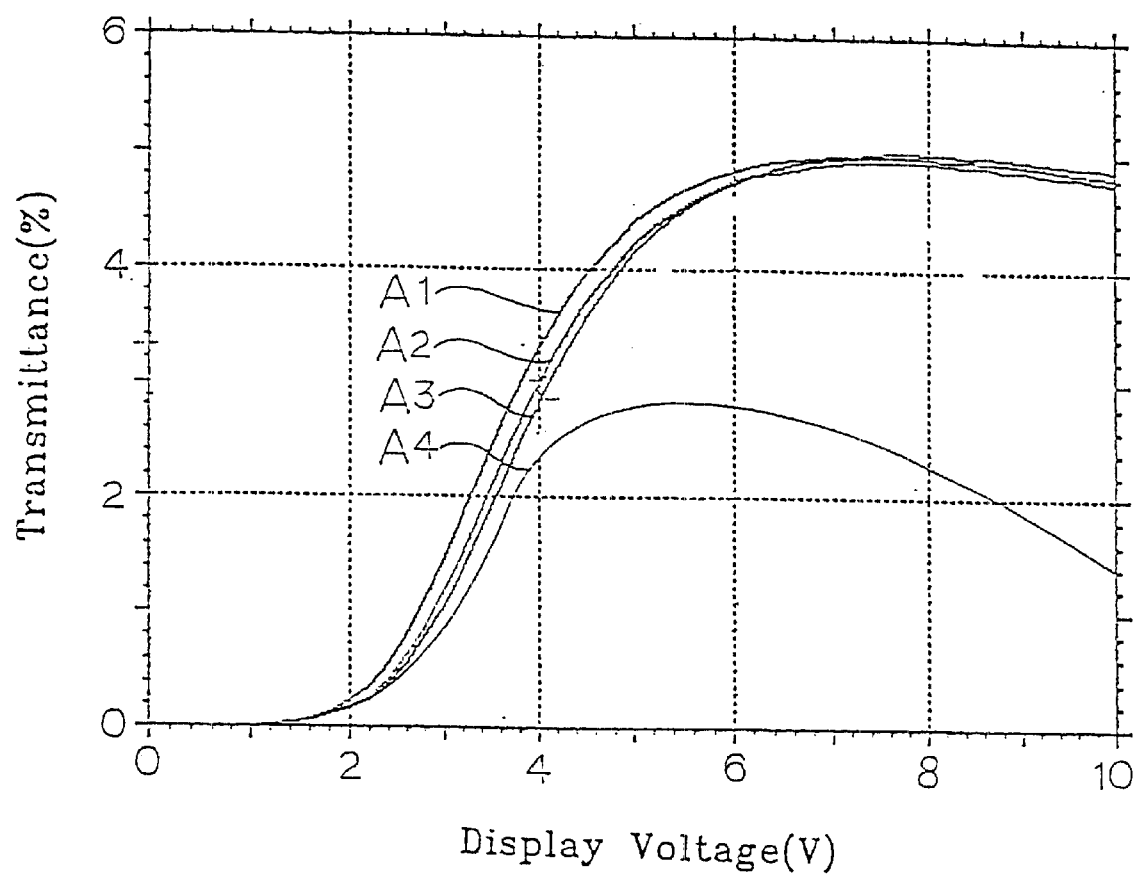
FIG. 13 is a simplified graph showing the transmittance variation functioning as the driving voltage in the liquid crystal display according to embodiments of the present invention.

FIG. 13 is a simplified graph showing light transmittance according to the display voltage applied to the pixel electrode, where A1–A3 corresponds to LCDs of the present invention while A4 corresponds to the conventional LCDs. In the FIG. 13, A1 corresponds to a case that the width P11 of the strip 43b of the counter electrode 43 is 3 $\mu$m, the width P12 of the strip 46b of the pixel electrode 46 is 3 $\mu$m, and the distance between the strip 43b of the counter electrode 43 and the second portion 46b of the pixel electrode is 1 $\mu$m. A2 corresponds to a case that the width P11 of the strip 43b of the counter electrode 43 is 4 $\mu$m, the width P12 of the strip 46b of the pixel electrode 46 is 3 $\mu$m, and the distance between the strip 43b of the counter electrode 43 and the strip 46b of the pixel electrode is 1 $\mu$m. A3 corresponds to a case that the width P11 of the strip 43b of the counter electrode 43 is 4 $\mu$m, the width P12 of the strip 46b of the pixel electrode 46 is 4 $\mu$m, and the distance between the strip 43b of the counter electrode 43 and the strip 46b of the pixel electrode is 1 $\mu$m. A4 corresponds to a case the widths of the strips 43b and 46b are both 20 $\mu$m and the distance therebetween is 210 $\mu$m.

As shown in FIG. 13, A1, A2 and A3 shows that the incident starts to transmit at about 1.7 V and their transmittances reach about 4.8% at about 6 V. On the other hand, the transmittance of A4 is lower than those of A1–A3 at the same voltage. In addition, the graph shows that saturation region in A4 case is very narrower than that in A1–A3 cases and its maximum transmittance reaches only 2.8% at application of about 5 V.

2. Present Embodiment 2

Figure 14A:
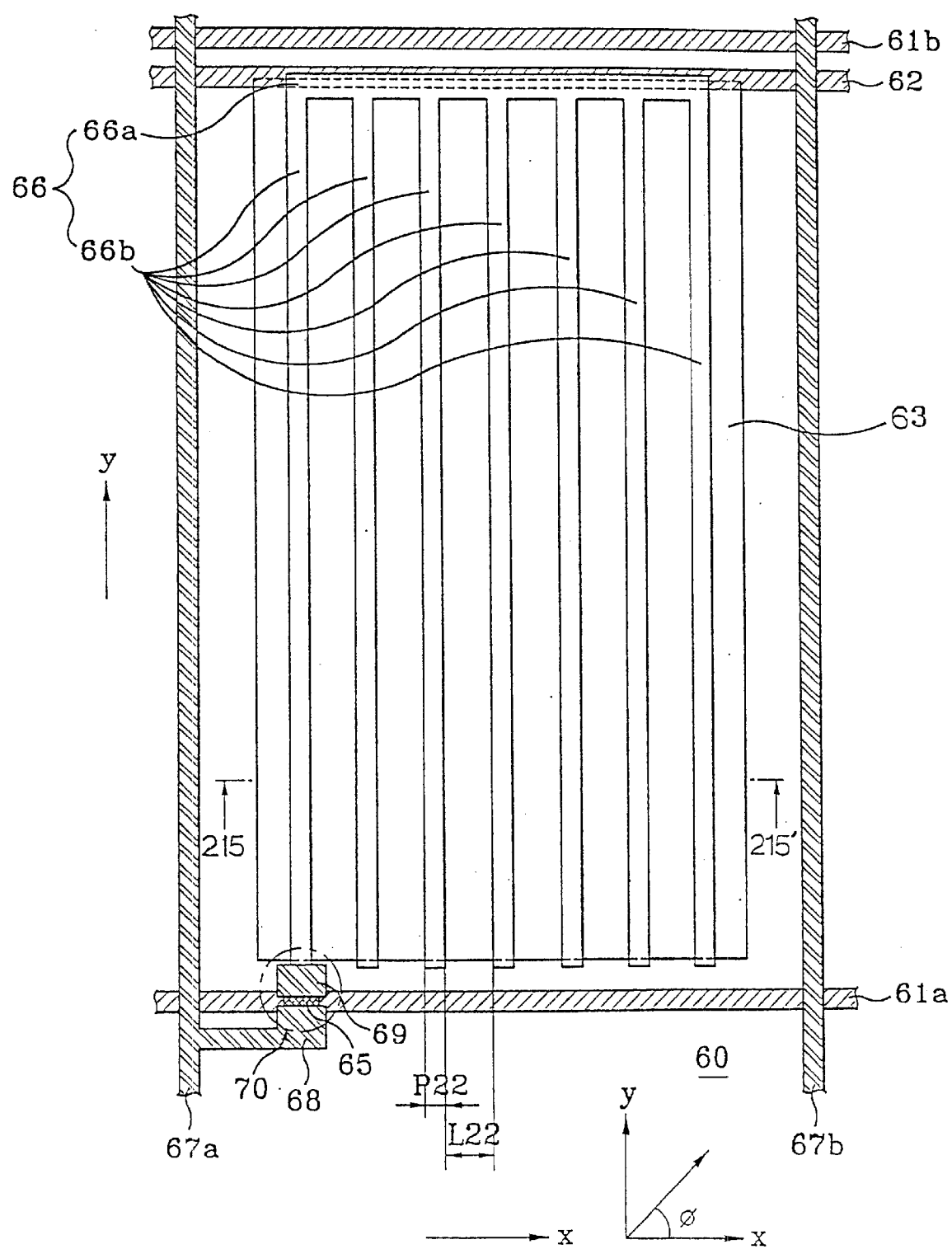
FIGS. 14A and 14B are simplified plan views of unit pixel region and portions of adjacent pixel regions surrounding it in the liquid crystal display according to alternative embodiments of the present invention.
Figure 14B:
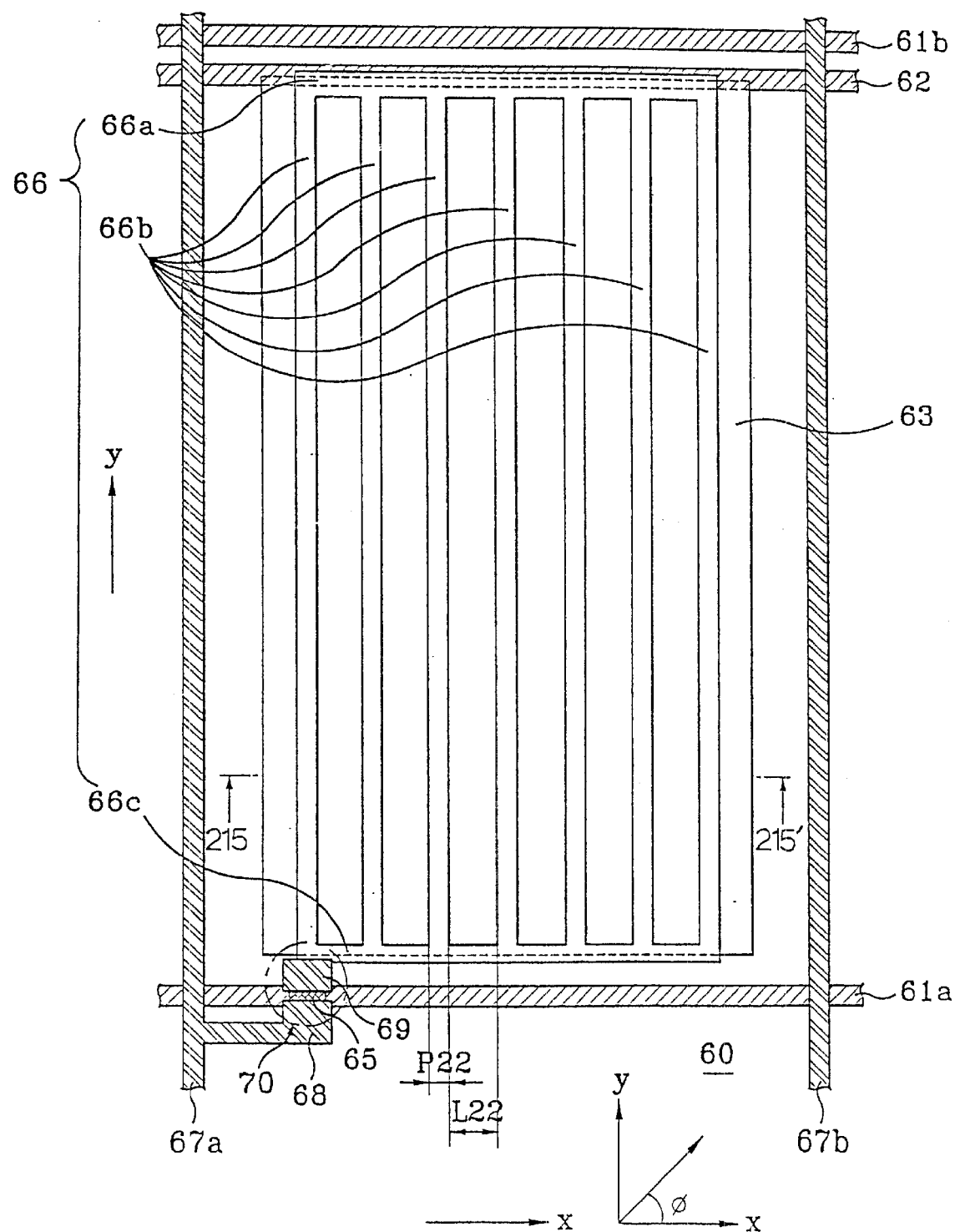
Figure 15:
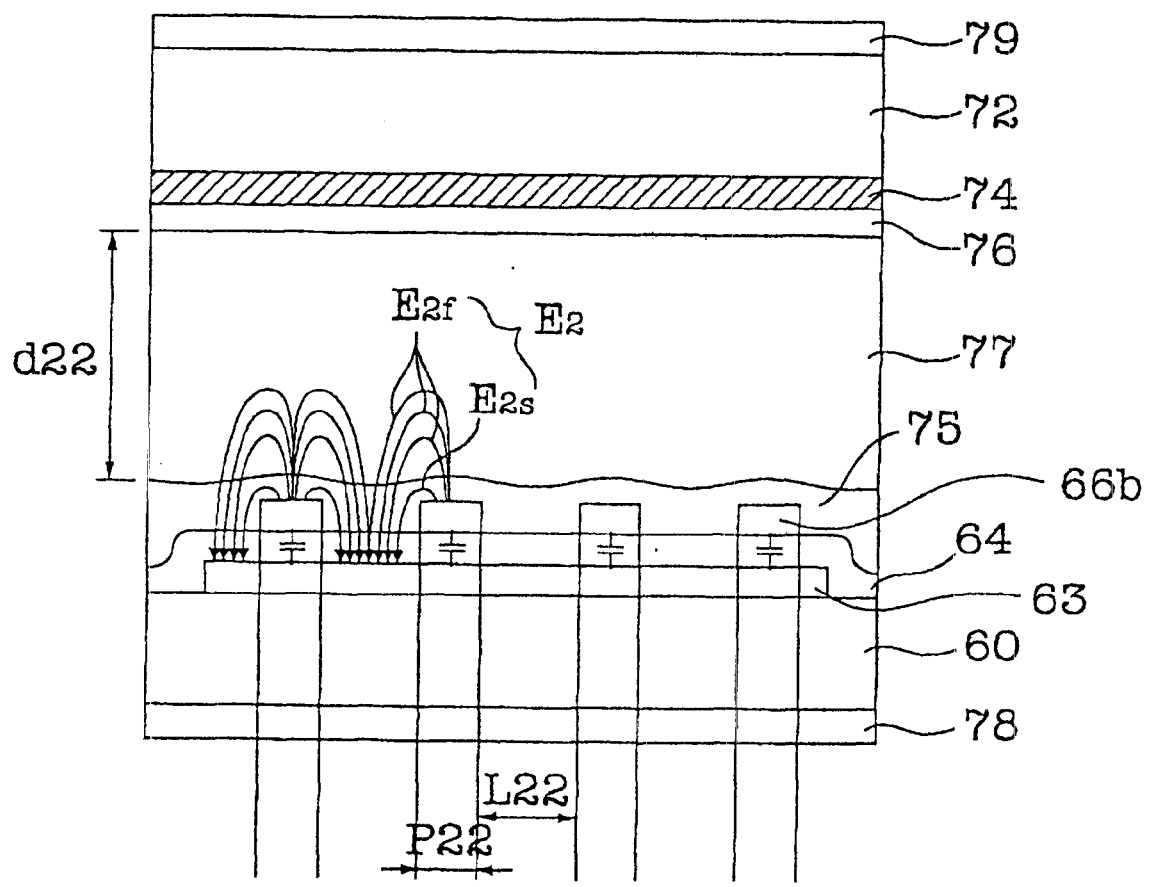
FIG. 15 is a simplified sectional view taken along the line 215–215' of FIGS. 14A and 14B.

Referring to FIG. 14A, FIG. 14B, and FIG. 15, the configurations of gate bus lines 61a and 61b, data bus lines 67a and 67b, and a common signal line 62 are same as that of the first embodiment. Here, the gate bus lines 61a and 61b, the common signal line 62, and the data bus lines 67a and 67b are made of one element or alloy of at least two elements selected from the group consisting of Al, Mo, Ti, W, Ta, and Cr each having a high conductivity. In the present embodiment 2, MoW is used.

A first or counter electrode 63 is disposed in the unit pixel region of a first or lower substrate 60. The counter electrode 63 is disposed on the same level plane that the gate bus line 61a and 61b. The counter electrode 63 is in contact with a common signal line 62. The counter electrode 63 is formed of a transparent conductive material such as ITO. The counter electrode is made in a structure having the form of a squared plate structure. Preferably, the counter electrode 63 is made in the form of a reduced unit pixel. More particularly, the counter electrode 63 is arranged to be spaced apart with a selected distance from the gate bus lines 61a and 61b and the data bus lines 47a and 47b.

A second or pixel electrode 66 is disposed in the unit pixel region of the first substrate 60. The pixel electrode 66 includes a body 66a and a plurality of strips 66b branched from the body 66a. The body 66a is arranged to be parallel to the gate bus lines 61a and 61b (e.g., arranged in x-direction). The plurality of strips 66b are arranged to be extended in the direction of the inverse y-axis from the body 66a. In the present embodiment 2, for example, the strips 66b are seven. The pixel electrode 66 is formed to overlap with the counter electrode 63 with the intervention of a gate insulating layer 64 as shown in FIG. 15. The pixel electrode 66 is made of a transparent conductive material such as ITO like the counter electrode 63.

The strips 66b each has a selected width P22 and is spaced apart from each other with a selected distance L22. When portions of the counter electrode 63 placed between the strips 66b of the pixel electrode 66 are hereinafter referred to as exposed portions of the counter electrode 63. Accordingly, in the present embodiment 2, like the first present embodiment 1, it can be identically thought that the strips 66b of the pixel electrode 66 alternate with the exposed portions of the counter electrode 63.

Meanwhile, open ends of the strips 66b of the pixel electrode 66 can be bound by another body 66c, as shown in FIG. 14B. The body 66c is also parallel to the x-axis direction.

Although not shown in the plane view of FIG. 14A and FIG. 14B, there exist a height difference between the exposed portions of the counter electrode 63 and the strips 66b of the pixel electrode 66, and it corresponds to the thickness of the gate insulating layer 64 as shown in the cross sectional view of FIG. 15.

When area of the unit pixel is 110 $\mu$m×330 $\mu$m, the distance L22 between the strips 66b of the pixel electrode 66 is set to be in a range of about 1 $\mu$m to 8 $\mu$m. The distance range can be varied with area of the unit pixel and the number of the strips 66b. However, regardless of area of the unit pixel region, the ratio of the width P22 of the strips 66b to the distance L22 between the strips 66b of the pixel electrode 66 must be set to be in a range of about 0.2 to 4.0, and the ratio of the distance L22 between the strips 66b of the pixel electrode 66 to the cell gap d22 must be set to be in a range of about 0.1 to 5.0.

Here, referring to FIG. 15, like the present embodiment 1 described previously, the same result is also obtained in the present embodiment 2. By signal voltages respectively applied to the strips 66b of the pixel electrode 66 and the counter electrode 63, an electric field is induced. The electric field includes a small number of linear field lines E2s and a large number of parabolic field lines E2f having high curvature. Here, the small number of linear field lines E2s are generated only in edge regions of the upper surfaces between the strips 66b of the pixel electrode 66 and the exposed portions of the counter electrode 63 adjacent thereto, having a height difference each other from the inner surface of the first substrate. The large number of parabolic field lines E2f are generated in major regions of the upper surfaces of the strips 66b and the exposed portions of the counter electrode 63. As a result, almost all the liquid crystal molecules overlying all the strips 66b of the pixel electrode and all the exposed portions of the counter electrode 63, that is, substantially all the liquid crystal molecules within the liquid crystal layer, are aligned along the directions of the electric field lines in the presence of electric field. The reason is that the widths P22 of the strips are narrower and the distance L22 is shorter, compared to the conventional LCDs, resulting in the generation of the parabolic electric field in even the central region of the upper surfaces of the strips of the pixel electrode and the exposed portions of the counter electrode.

Referring to FIGS. 14A and 14B, arrangement of a TFT 70 is also the same as that of the embodiment 1. The TFT 70 includes a channel layer 65 disposed on the gate bus line 61a, a drain electrode 68 overlapped with one side of the channel layer 65, extending from the data bus line 67a, and a source electrode 69 overlapped with the other side of the channel layer 65 and connected to the pixel electrode 66.

In the present embodiment 2, storage capacitor Cst is formed at a first overlapped portion between the body 66a of the pixel electrode 66 and the counter electrode 63, and a second overlapped portion between the strips 66b of the pixel electrode 66 and the counter electrode 63. Accordingly, total storage capacitance in the present embodiment 2 increases compared with the present embodiment 1.

Referring to FIG. 15, an upper substrate 72 is disposed opposite the first substrate 70 having the above structure with a selected distance d22 therebetween. The first and second substrates 70 and 60 each has inner surfaces opposite to each other and outer surfaces not being opposite to each other. A color filter 54 is formed on the inner surface of the second substrate 52.

Alignment directions of the first and second alignment films 75 and 76 and an angle between the rubbing axis and x-axis are same as those of the present embodiment 1. The arrangements of the polarizer 78 and the analyzer 79 are also same as those of the present embodiment 1.

A liquid crystal layer 77 is interposed between the first and second alignment films 75 and 76. The liquid crystal layer 77 is nematic liquid crystal and has a twistable structure. As described above, dielectric anisotropy $\Delta\in$ of the liquid crystal molecules is selected for the purpose of insuring maximum transmittance in view of the angle between the rubbing axis and x-axis. The anisotropy of refractive index $\Delta n$ and the cell gap d22 are set so that the product of the $\Delta n$ and the d11 is in a range of about 0.2–0.6 $\mu$m.

Furthermore, the liquid crystal display according to the second embodiment can be fabricated according to the same method as that of the first embodiment. Therefore, the method will be omitted.

Hereinafter, operation of the liquid crystal display according to the second embodiment will be explained with reference to the FIGS. 14A, 14B, and 15.

When no signals are applied to the counter and pixel electrodes 63 and 68, and accordingly an electric field is not produced between the counter and pixel electrodes 63 and 66, the dark state appears as described in the present embodiment 1.

On the other hand, when signals are applied to the counter electrode 63 and pixel electrode 66, since there is no interval between the exposed portion of the counter electrode 63 and the strips 66b of the pixel electrode 66, an electric field including the small number of the linear electric field line E2s and the large number of parabolic electric field lines E2f having high curvature, is produced. As described in the present embodiment 1, most of the liquid crystal molecules over the exposed portions of the counter electrode 63 and the strips 66b of the pixel electrode 66 are aligned under the influence of the parabolic field lines E2f, and accordingly incident light transmits the liquid crystal 77 and the analyzer. As a result, the white state appears in the display.

Figure 16:
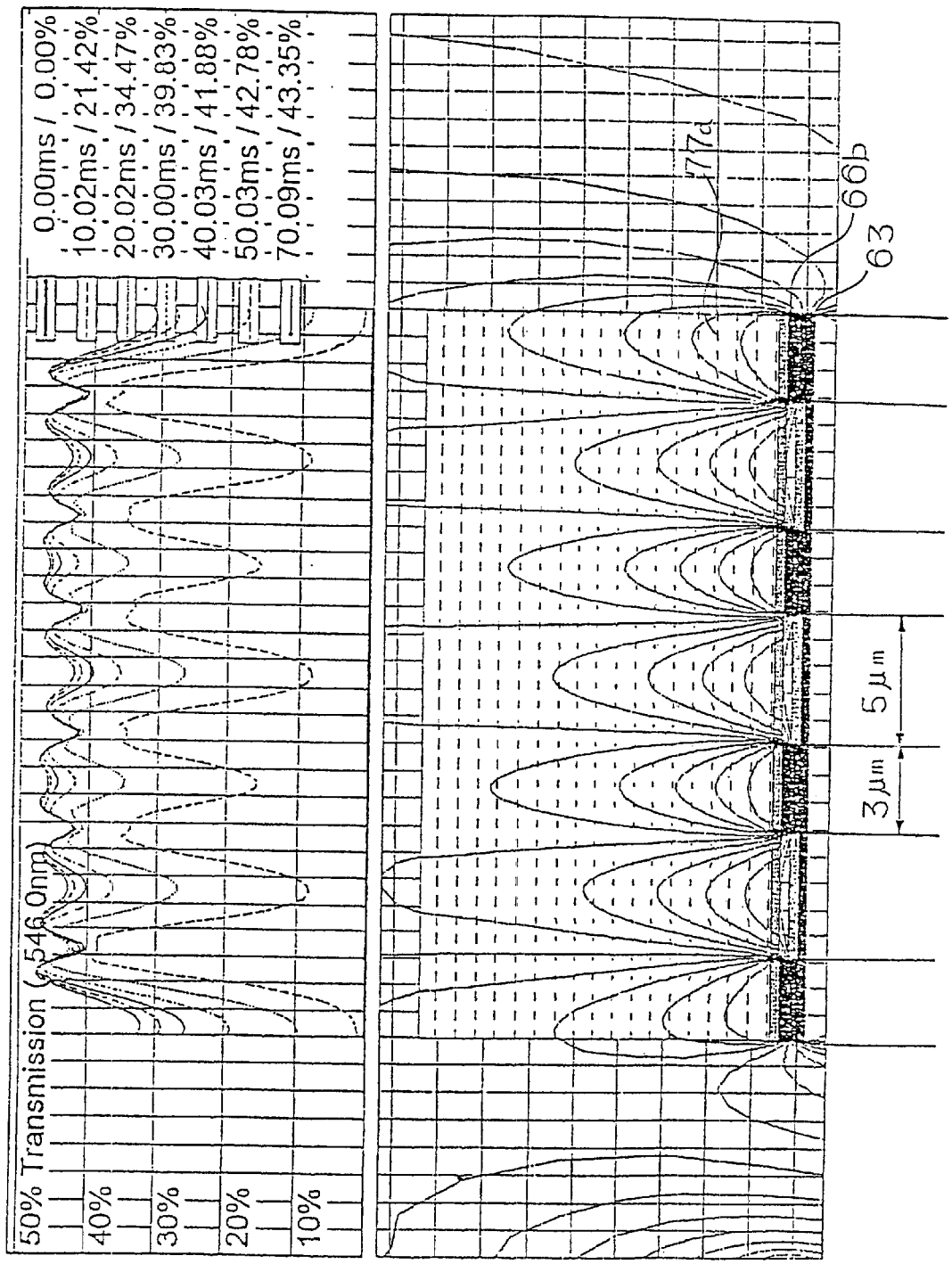
FIGS. 16 and 17 shows simplified simulation results of the transmittance variation according to the lapse of time after the application of an electric field in the unit pixel region of the liquid crystal display according to embodiments of the present invention.

FIG. 16 shows a simplified simulation result of the liquid crystal displays according to the present embodiment 2 of the invention. Here, the width P22 of the strips 66b of the pixel electrode 43 is 3 µm. The distance L22 between the strips 66b of the pixel electrode 66 is 5 µm. The cell gap d is 3.9 µm and the pretilt angle is 2 degrees. The angle between the rubbing axis of the first alignment film 75 and the electric field direction (x-axis direction) is 12 degrees and the dielectric anisotropy Δn of the liquid crystal 77 is −4. And is 0.29, light wavelength λ is 546 nm, and the driving voltage is 6.3 V.

As shown in FIG. 16, since the liquid crystal molecules above the electrodes 63 and 66b as well as the liquid crystal molecules therebetween are all oriented, uniform transmittance is shown at all the regions. When a necessary voltage is applied to the strips 66b of the pixel electrode, the transmittance is saturated after the lapse of 40.03 ms to reach a high value of about 41.88%. Thus, the transmittance of the liquid crystal display in the present invention is higher than that in the conventional LCDs during the same time period. Accordingly, it is noted that the liquid crystal display of the present invention is shorter in time which reach the same transmittance than the conventional devices, and thereby response time is also improved compared with that of the conventional devices.

Figure 17:
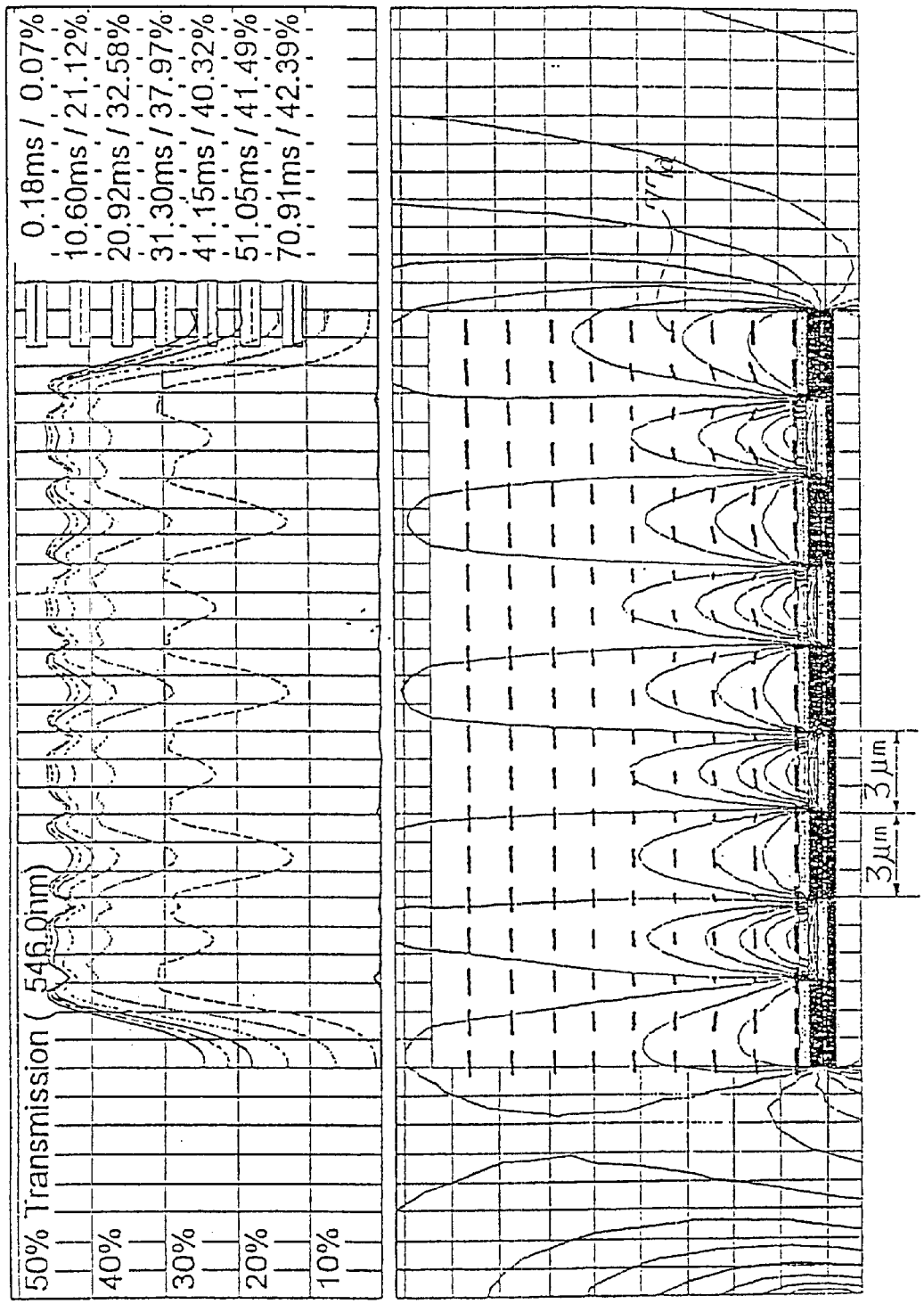

FIG. 17 shows a simplified simulation result of the liquid crystal display according to,the present invention. Here, the width P22 of the strips 66b of the pixel electrode 66 is 3 µm. The distance L22 between the strips 66b of the pixel electrode 66 is 3 µm. The cell gap d is 3.9 µm and the pretilt angle is 2 degrees. The angle between the rubbing axis of the first alignment film 75 and the field direction(x-axis) is 12 degrees and the dielectric anisotropy Δ∈ of the liquid crystal 77 is −4. And is 0.28, light wavelength λ is 546 nm, and the driving voltage is 6 V.

Similarly with the result shown in FIG. 16, uniform transmittance is shown at all the regions. When a necessary voltage is applied to the pixel electrode 66, transmittance is saturated after the lapse of 41.15 ms to reach a high value of about 40.32%. Thus, the transmittance of the liquid crystal displays in the present invention is higher than that in the conventional LCDs during the same time period. As a result, the response time of the present invention is faster than that of the conventional LCDs.

3. Present Embodiment 3

Referring to FIGS. 20A and 20B, gate bus lines 81a and 81b, a common signal line 82, and data bus lines 87a and 87b are arranged on a first or lower substrate 80, which is. the same manner as the present embodiment 1. Unit pixel regions of a liquid crystal display each is defined as a region bounded by a pair of gate bus lines 81a and 81b and a pair of data bus lines 86a and 86b. Here, the gate bus lines 81a and 81b, a common signal line 82, and the data bus lines 87a and 87b each can be made of an opaque material of one element or alloy of at least two elements selected from a group consisting of Al, Mo, Ti, W, Ta, and Cr. In the present embodiment 3, MoW alloy is used.

A counter electrode 83 is arranged in the unit pixel of the first or lower substrate 80. The counter electrode 83 is placed on the same level plane that the gate bus lines 81a and 81b, i.e., on the surface of the lower substrate 80, and is electrically in contact with the common signal line 82. The counter electrode 83 is made of a transparent conductive material, for example, ITO. The counter electrode 83 includes a body 83a and a plurality of strips 83b. The body 83a is parallel to the gate bus lines 81a and 81b, i.e., x-direction and is electrically in contact with the common signal line 82. The plurality of strips 83b are branched from the body 83a, and are parallel to the direction of the inverse y-axis. The strips in the present embodiment 3 is eight. More specifically, the counter electrode 83 has a comb structure whose one sided ends are closed by the body 83a and the other sided ends are open. The strips 83b each has a selected width P31 and is spaced apart from a strip adjacent thereto by a selected interval L31. The width P31 is determined, considering relationship with pixel electrode which will be further formed.

Figure 19:
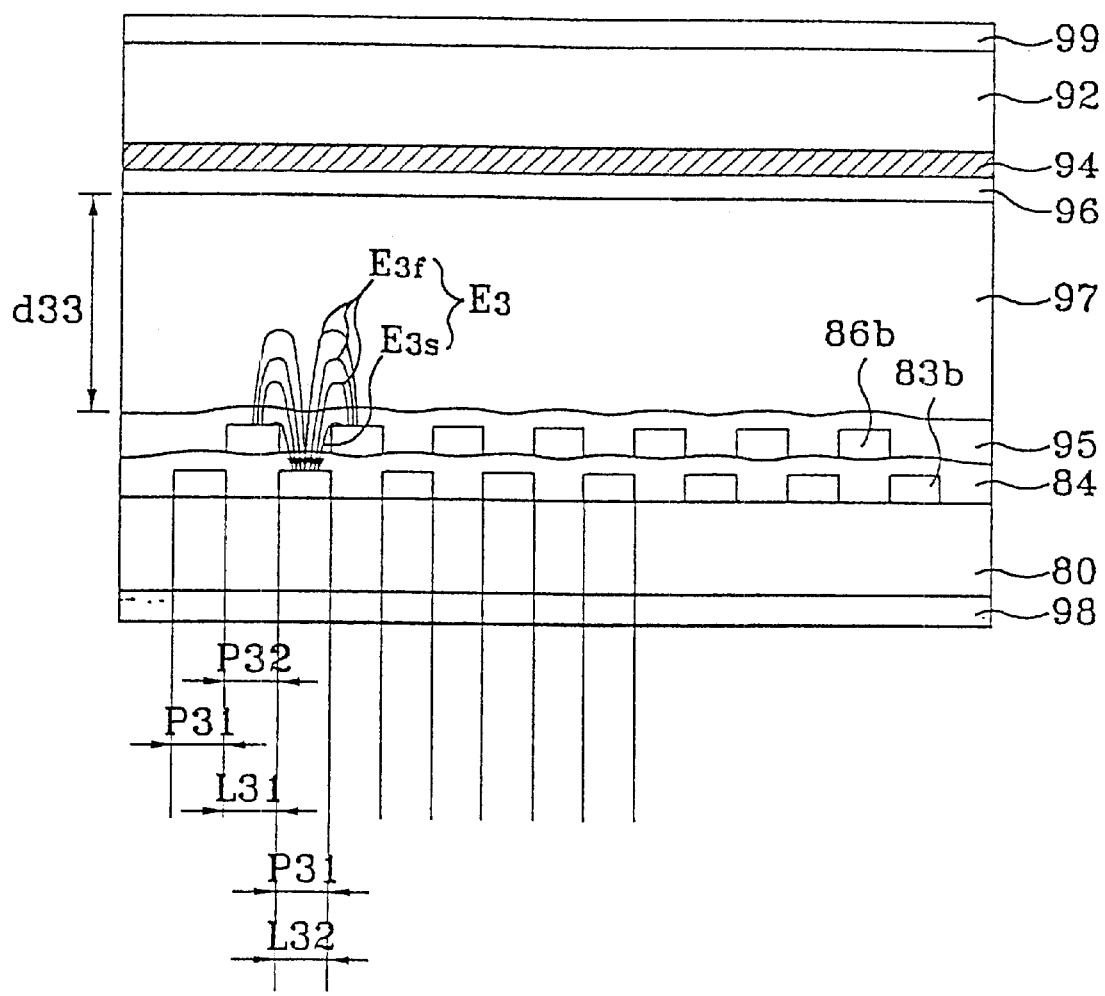
FIG. 19 is a simplified section views taken along the line 219–219' of FIGS. 18A and 18B.

A pixel electrode 86 is also arranged in the unit pixel region of the lower substrate 80. Like the counter electrode 83, the pixel electrode 86 is also made of transparent conductive material such as ITO. The pixel electrode 86 also includes a body 86a and a plurality of strips 86b. The body 86a is arranged to be parallel with the gate bus lines 81a and 81b, i. e., x-direction. The plurality of strips 86b are arranged to be extended in the direction of the inverse y-axis. More specifically, the pixel electrode 86 has a comb structure whose one sided ends are closed by the body 86a and the other sided ends are open. The strips of the pixel electrode 86 in the present embodiment 3 is seven. In the present embodiment 3, the width P32 of the strips 86b is identical to the interval L31 between two adjacent strips 83b of the counter electrode 83, and interval L32 between two adjacent strips 86b is identical to the width P31 of the strip 83b. The strips 86b of the pixel electrode 86 each is placed between two adjacent strips 83b of the counter electrode 83 such that both edge lines of the respective strips 86b are precisely aligned with edge lines of strips 83b of the counter electrode 83 adjacent thereto, whereby the strips 86b of the pixel electrode 86 alternate with the strips 83b of the counter electrode 83 with the intervention of a gate insulating layer 84 as shown in FIG. 19.

The strips 83b of the counter electrode 83 and the strips 86b of the pixel electrode 86 each has such a degree of width to produce electric field by which all the liquid crystal molecules overlying the two electrodes can be aligned. For example, when area of the unit cell region is 110 µm×330 µm in the present embodiment 3, the widths P31 of the strips 83b of the counter electrode 83 and the widths P32 of the strips 86b of the pixel electrode 86 each is set to be in a range of about 1 µm to 8 µm. Alternatively, the widths P31 and P32 can be varied with the area of the unit pixel, the numbers of the strips, and the number of the strips 86b. However, regardless of area of the unit pixel region, the ratio of the width P32 of the strips 86b to the width P31 of the strips 83b of the pixel electrode 66 must be set to be in a range of about 0.2 to 4.0.

Figure 18:
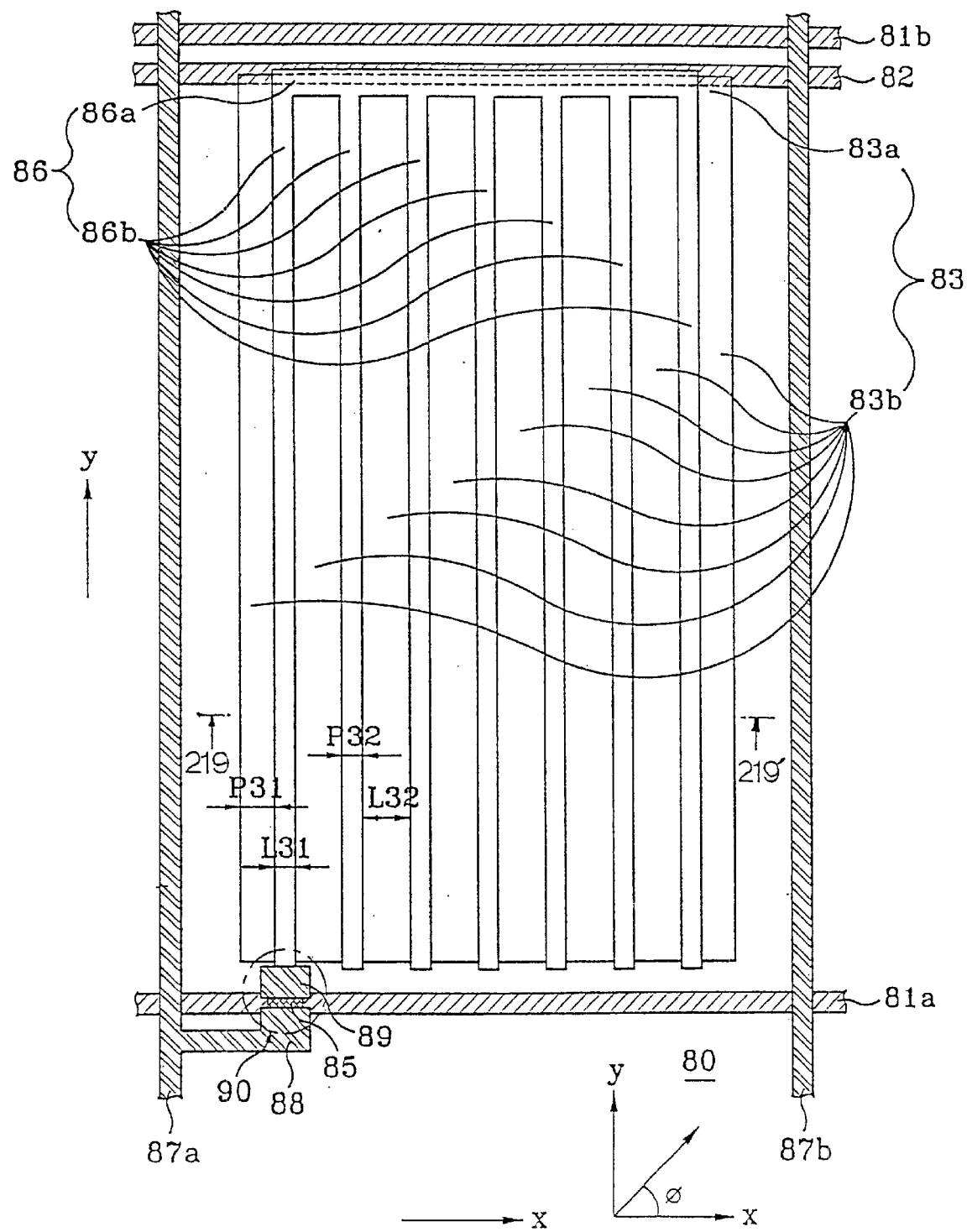
FIGS. 18A and 18B are simplified plan views of unit pixel region and portions of adjacent pixel regions surrounding it in the liquid crystal display according to alternative embodiments of the present invention.
Figure 18:
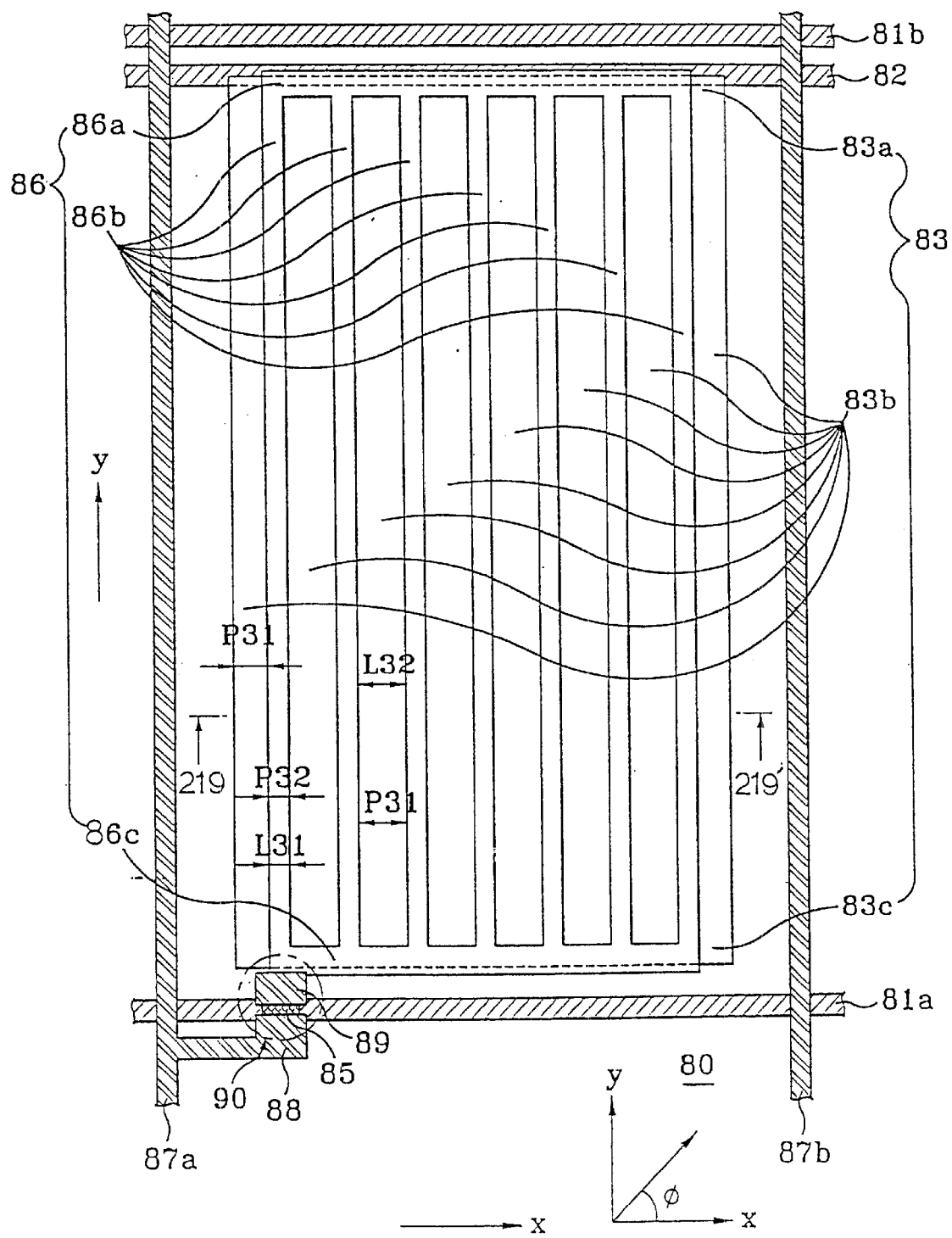

Meanwhile, structures of the counter electrode and the pixel electrode can be modified. For example, as shown in FIG. 18B, the open sided ends of the strips 83b of the counter electrode 83 and the open sided ends of the strips 86b of the pixel electrode 86 are bound by respective corresponding bodies 83c and 86c which are parallel to the gate bus line 81a. Although not shown in the drawings, it is possible to selectively bind either the open sided ends of the strips 83b or the open sided ends of the strips 86b. Furthermore, the strips 86b of the pixel electrode 86 can be bound to each other only by one body 86c without using the body 86a.

A thin film transistor("TFT") 90 used as a switching element, is formed on a crossing point of the gate bus line 81a and the data bus line 87a. The TFT 90 includes a channel layer 85 formed on the gate bus line 81a, a drain electrode 88 extending from the data bus line 87a and overlapped with one side of the channel layer 85 by a selected portion, and a source electrode 89 overlapped with the other side of the channel layer 85 by a selected portion and connected to the pixel electrode 86.

A storage capacitor Cst is formed between the body 83a of the counter electrode 83 and the body 86a of the pixel electrode 86.

As shown in FIG. 19, an upper or second substrate 92 is disposed opposite the first substrate 80 having the structure described above so that the first and second substrates 80 and 92 are spaced apart from each other with a selected distance, i.e., cell gap d33. A color filter 96 is disposed on the inner surface of the second substrate 92.

First and second alignment films 95 and 96 have the same properties as those used in the present embodiment 1. Also, polarizer 98 and analyzer 99 are arranged in the same manner as the present embodiment 1.

A liquid crystal layer 97 comprising a plurality of liquid crystal molecules of a rod shape is interposed between the first and second alignment films 95 and 96. The liquid crystal layer 97 is nematic liquid crystal whose molecules are twisted in the presence of the electric field. Anisotropy of the refractive index $\Delta n$ of the liquid crystal 97 is set such that it satisfies a condition for maximum transmittance. At this time, it is requested that an angle between rubbing axis of the first and second alignment films 95 and 96, and x-direction should be considered. In the present embodiment, a product of the refractive index $\Delta n$ and the cell gap d33 is set to be in a range of about 0.2 to 0.6 $\mu m$.

Since a fabrication method of the above described LCD displays is the same as that of the present embodiment 1, description is intentionally omitted.

Next, operation of the above liquid crystal display will be explained with reference to the accompanying drawings.

When electric field is not produced between the counter and pixel electrodes 83 and 86 incident light beams does not transmit the liquid crystal layer due to the same reason as the present embodiment 1.

On the other hand, when a critical voltage is respectively applied to the counter electrode 83 and the pixel electrode 86, electric field is produced between the strips 83b of the counter electrode 83 and the strips 86b of the pixel electrodes 86. The electric field includes a small number of linear field lines E3s and a large number of parabolic field lines E3f having high curvature. Here, the small number of linear field lines E3s are generated only in edge regions of the upper surfaces between the strips 43b and the strips 46b adjacent thereto, having height difference each other from the inner surface of the first substrate 80. The large number of parabolic field lines E3f are generated in major regions of the upper surfaces therebetween. Since the parabolic electric field lines E3f are induced on almost all the upper surfaces of the strips 83b and 86b between the adjacent electrodes 83b and 86b, almost all the liquid crystal molecules overlying all the strips of the electrodes, that is, substantially all the liquid crystal molecules within the liquid crystal layer, are aligned along the directions of the parabolic electric field lines E3f in the presence of the field. The reason that substantially all the liquid crystal molecules are aligned by the electric field is that the widths of the strips are sufficiently small, compared to the conventional LCDs, resulting in the generation of the parabolic electric field in even the central region of the upper surfaces of the strips 83b and 86b.

Figure 20:
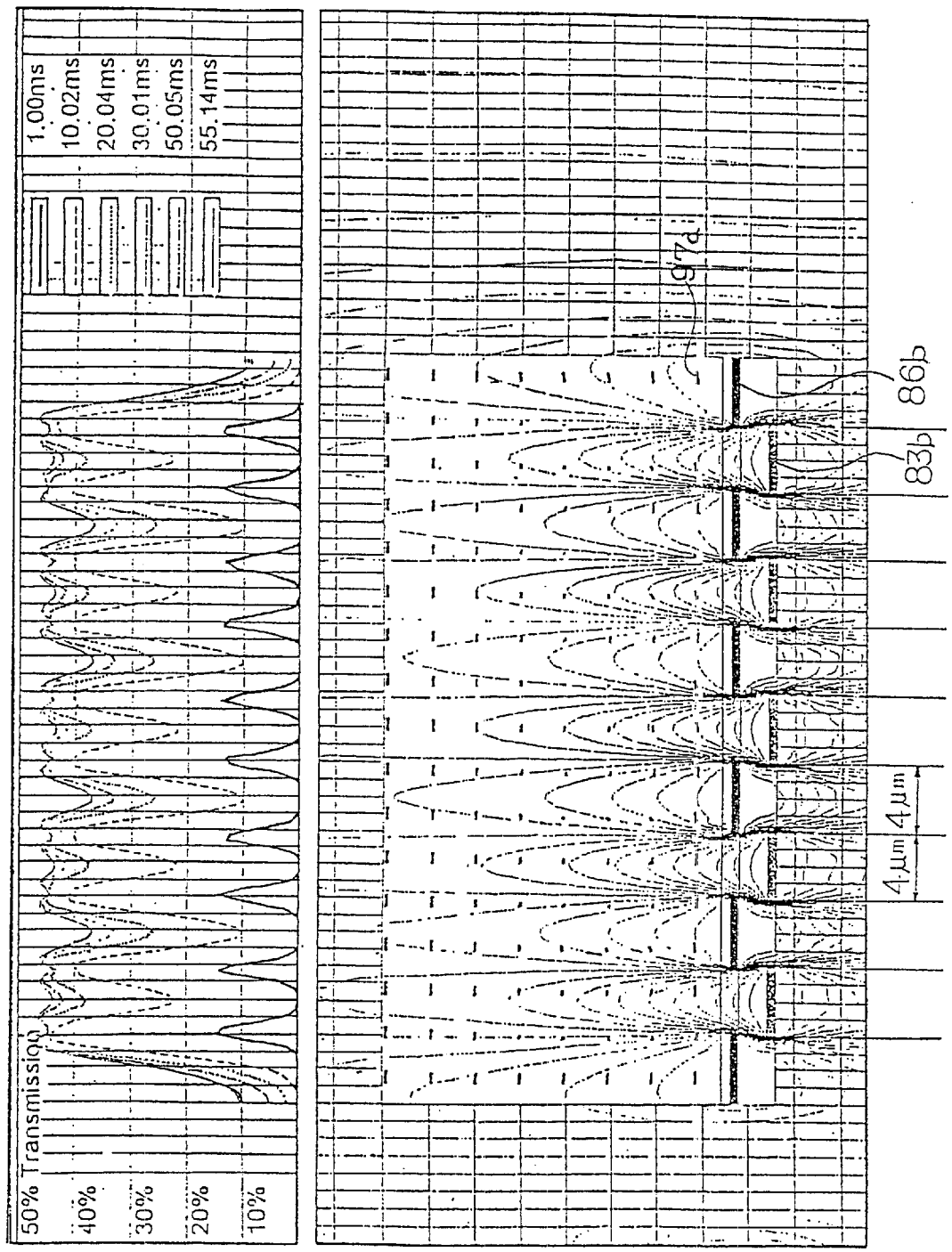
FIG. 20 shows a simplified simulation result of the transmittance variation according to the lapse of time after the application of an electric field in the unit pixel region of the liquid crystal display according to embodiments of the present invention.

FIG. 20 shows a simplified simulation result of the liquid crystal display according to the present embodiment 3 of the invention. Here, the width P32 of the strips 86b of the pixel electrode 86 is 4 $\mu m$. The distance L32 between the strips 86b of the pixel electrode 86 is 4 $\mu m$. The cell gap d is 3.9 $\mu m$ and the pretilt angle is about 1 degree. The angle the rubbing axis of the first alignment film 95 and the field direction(x-axis direction) is 15 degrees and the dielectric anisotropy $\Delta \in$ of the liquid crystal 77 is −3.4. A product of anisotropy of the refractive index $\Delta n$ and cell gap d is 0.25, light wavelength $\lambda$ is 546 nm, and the driving voltage is 6V.

As shown in FIG. 20, since the liquid crystal molecules above the strips 83b and 86b as well as the liquid crystal molecules therebetween are aligned, uniform transmittance is shown at all the regions. When the voltage is applied to the pixel electrode 46b, the maximum transmittance is obtained after the lapse of 30.01 ms, and shows a high value of about 34%. Thus, the maximum transmittance of the liquid crystal display in the present invention is higher than that in the conventional devices during the same time period. In addition, since the present liquid crystal displays are short in the time which reach the same transmittance than the conventional LCDs, response time becomes also faster compared with that of the conventional devices.

Figure 21A:
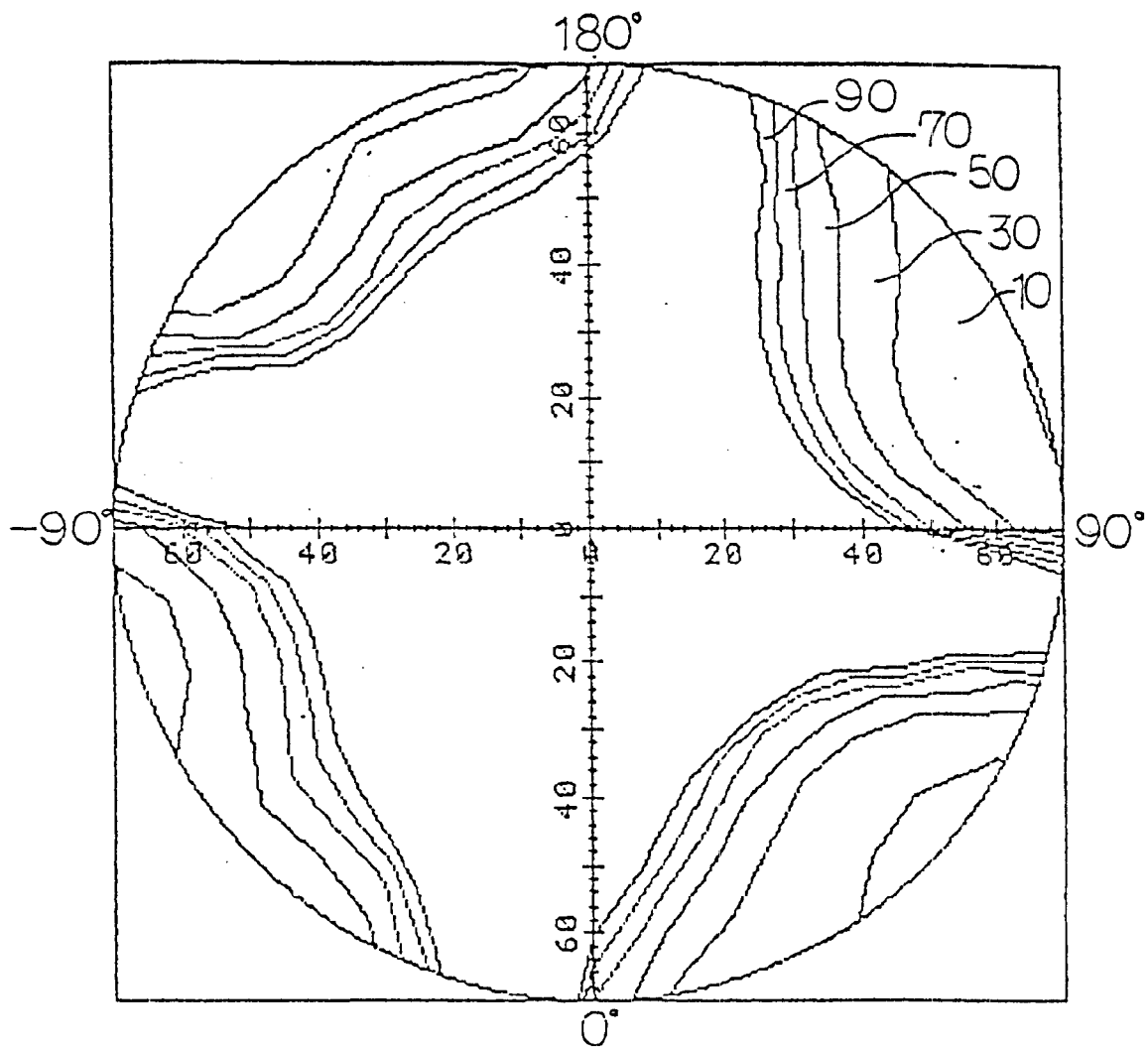
FIG. 21A shows a simplified contrast dependent on viewing angle in a liquid crystal display according to embodiments of the present invention.
Figure 21A:
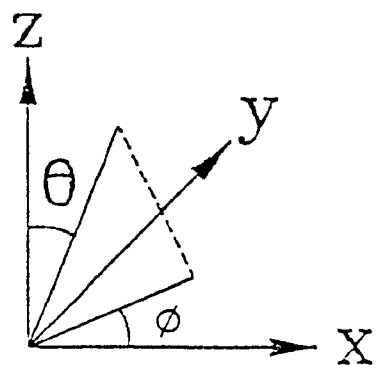

FIG. 21A shows an iso-contrast curve according to the viewing angle in the present embodiment 2 and FIG. 18B shows an iso-contrast curve according to the conventional LCDs. In FIGS. 18A and 18B, all points on the screen are coordinated with x-y plane and z-axis normal to the x-y plane where $\phi$ is azimuthal angle changing from 0 degree to 360 degrees and $\theta$ is polar angle changing from −90 degrees to 90 degrees.

Figure 21B:
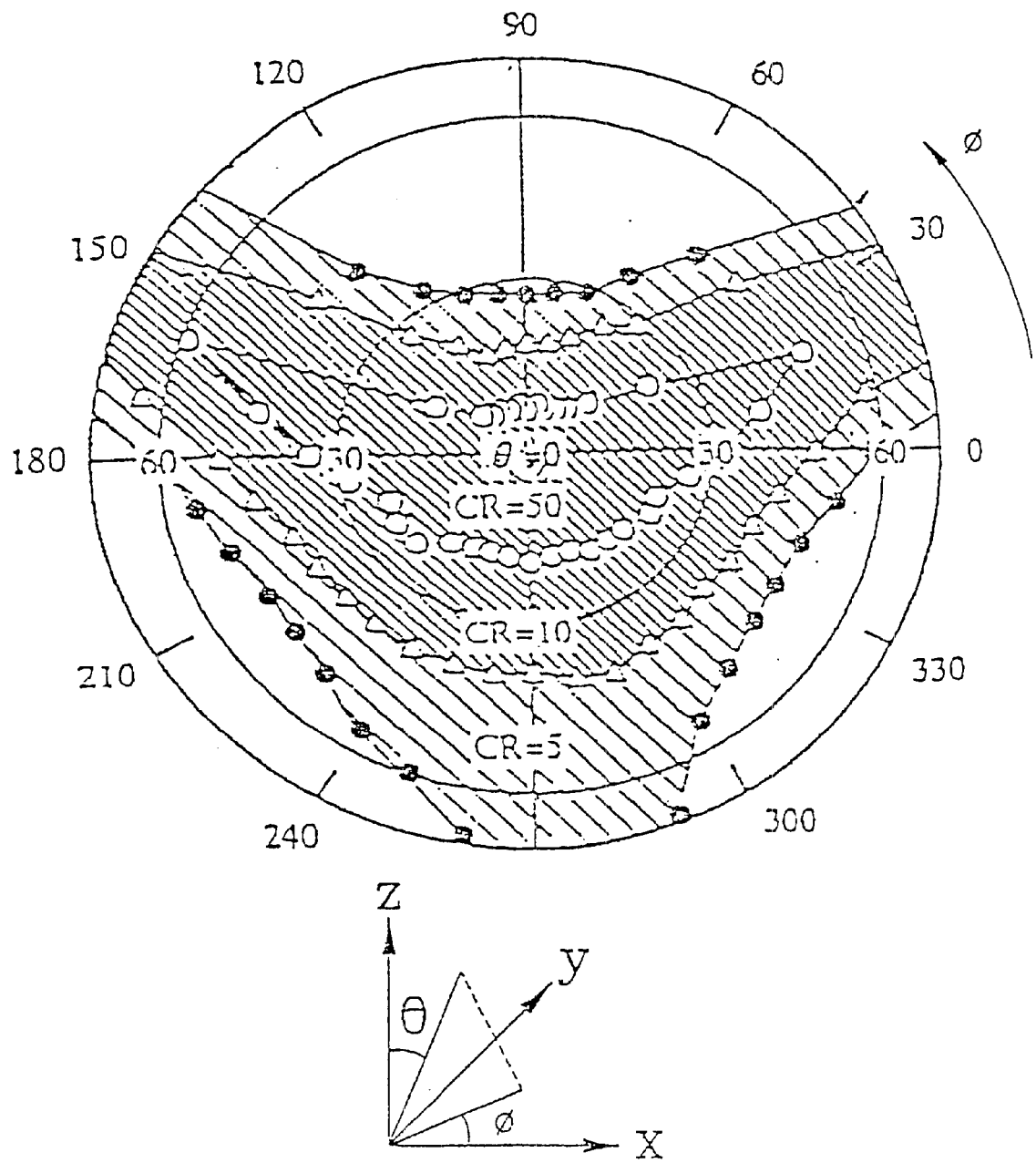
FIG. 21B shows a simplified contrast dependent on viewing angle in a conventional liquid crystal display.

In FIG. 21A, most of all regions shows a contrast ratio of 10 or more but one-fold corresponding to the azimuthal angle of 0 degree to 90 degrees partly shows a region having a contrast ratio less than 10 at its edge portion. On the other hands, in FIG. 21B, a majority of regions show a contrast ratio less than 10. This result indicates that the region having the contrast ratio of about 10 is of wide distribution in the liquid crystal display of the present invention than in that of the conventional LCDs.

Figure 22:
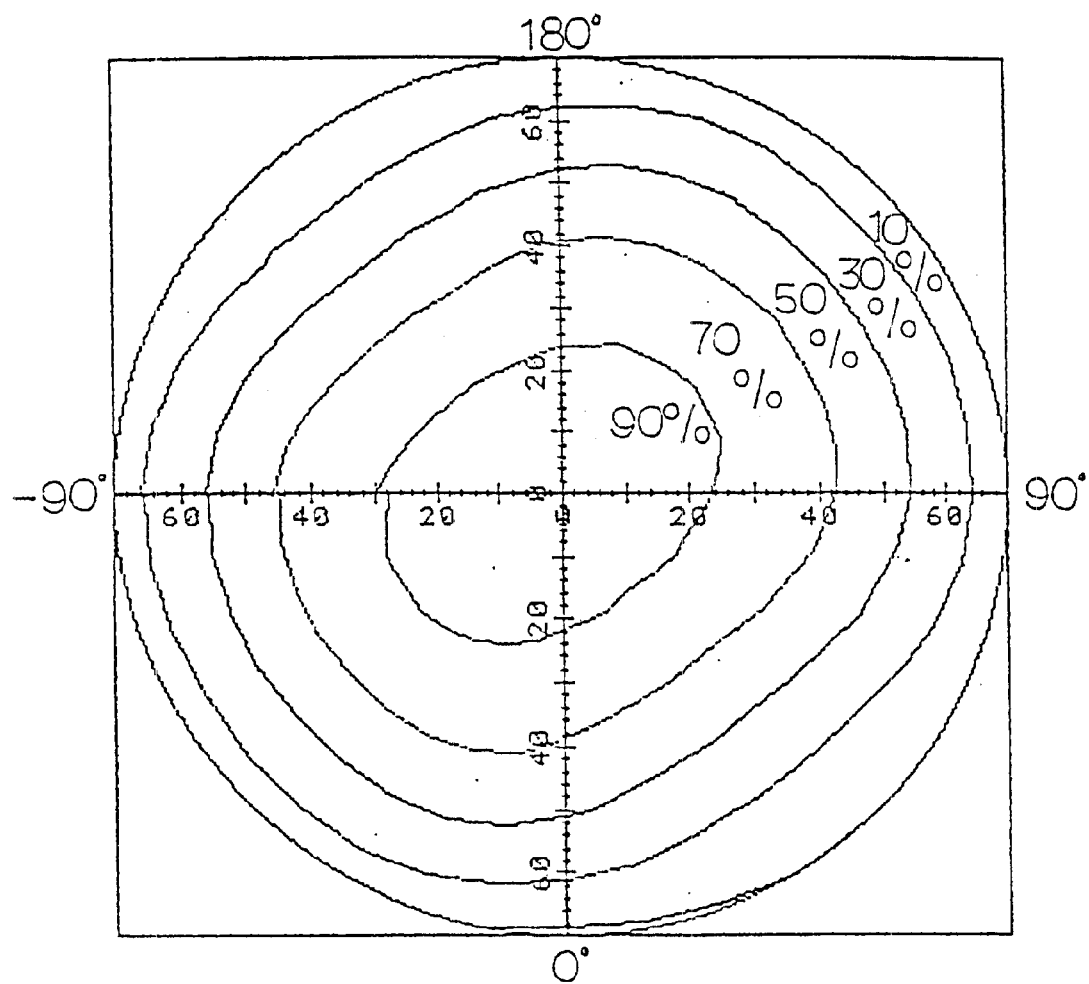
FIG. 22 shows a simplified brightness dependent on viewing angle in a liquid crystal display according to embodiments of the present invention.
Figure 22:
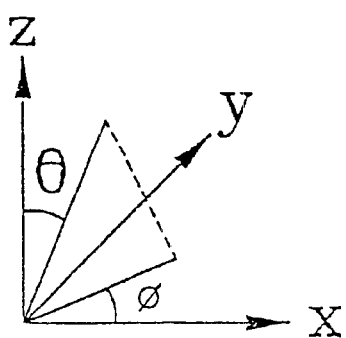

FIG. 22 shows the dependence of brightness on the viewing angle in the present embodiments 1–3. In FIG. 22, numeral 90% indicates a region where the brightness is above 90%. Numeral 70% indicates a region where the brightness is above 70%. In a similar manner, each numeral % indicates an illustrated region where the brightness is above the numeral barrier.

As shown in FIG. 22, all of the illustrated regions show the uniform brightness of 10% or more. Therefore, excessive white phenomenon which a large amount of light is transmitted at an azimuthal viewing angle of 180 degrees and excessive black phenomenon which a little amount of light is transmitted at an azimuthal viewing angle of 0 degree, are not generated, which are quite different characteristics from the conventional TN mode.

Figure 23:
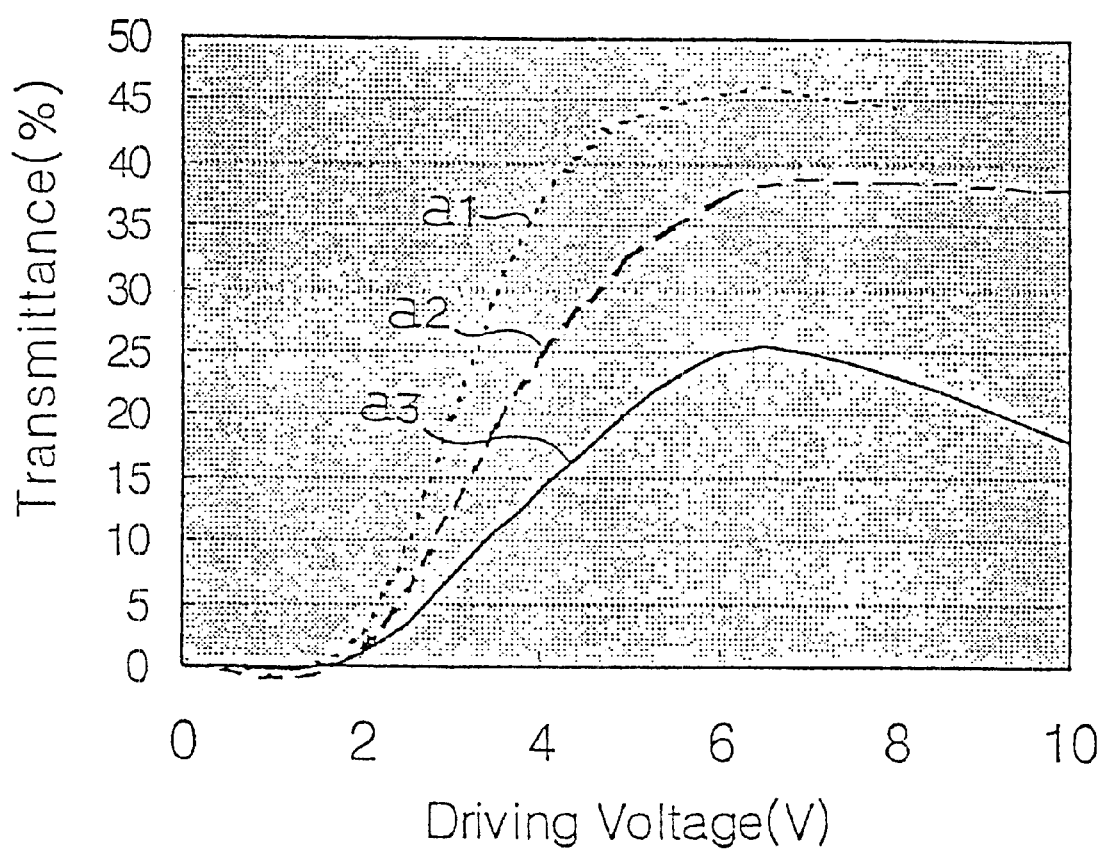
FIG. 23 is a simplified graph showing the transmittance variation functioning as the driving voltage in the liquid crystal display according to embodiments of the present invention.

FIG. 23 is a simplified graph showing light transmittance according to driving voltage applied to the pixel electrode. In the FIG. 23, a1 and a2 are the transmittance curves of the liquid crystal display according to the present embodiments 1–3 of the present invention while a3 is the transmittance curve of the liquid crystal display according to the conventional LCDs having the general IPS mode. Here, a1 corresponds to a case the anisotropy of the refractive index Δn is 0.08, a2 corresponds to a case the anisotropy of the refractive index Δn is 0.1, and a3 corresponds to a case the anisotropy of the refractive index Δn is 0.1.

As shown in FIG. 23, transmittance of the liquid crystal display according the embodiments 1–3 is superior to that of the liquid crystal display having IPS mode according to the conventional devices. Comparing with a1 and a2, it is noted that the liquid crystal display with more higher index of refractive anisotropy shows a superior transmittance characteristic compared with the liquid crystal display with lower anisotropy of refractive index. However, if the anisotropy of the refractive index Δn is greatly high, the transmittance improves but color shift may be generated. Therefore, in order to avoid the color shift, liquid crystal with appropriate the anisotropy of refractive index Δn must be selected. The present invention is not defined to the above embodiments. For example, the same effects can be obtained by forming the strips 46b, 66b, or 86b of each of the pixel electrode 46, 66, or 86 such that their widths P12, P22, and p32 are greater than the widths of the exposed portion of the counter electrodes 43, 63, or 83.

As described above, according to this invention, the counter and pixel electrodes are both formed of transparent material, the distance between the two electrodes is formed to be smaller than the cell gap, the widths of the two electrodes are formed to be narrow sufficiently such that the parabolic field line component produced at both sides of them substantially move liquid crystal molecules overlying the two electrodes. As a result, a high transmittance can be obtained compared with that of the conventional devices.

Moreover, since the counter and pixel electrodes are formed of transparent material, aperture ratio is greatly enhanced.

Furthermore, since the distance between the counter electrode and the pixel electrode is a very small, parabolic field line component with high curvature and high intensity is produced to thereby effectively move the liquid crystal molecules overlying the two electrodes. As a result, response time is greatly improved.

Additionally, since the distance between the counter and pixel electrodes is smaller than the cell gap, threshold voltage can be lowered compared with the liquid crystal display of the conventional devices with the distance greater than the cell gap.

Further, wide viewing angle is obtained.

Moreover, since the height difference between the counter and pixel electrodes can be lowered, an additional planarization process is needless. As a result, the rubbing process becomes easier.

Various other modifications will be apparent to and can be readily made by those skilled in the art without departing from the scope and spirit of this invention. For example, the pixel electrode and the counter electrode may be exchangeable with some modification. Accordingly, it is not intended that the scope of the claims appended hereto be limited to the description as set forth herein, but rather that the claims be broadly construed.

What is claimed is:

1. A liquid crystal display comprising:
a first substrate and a second substrate, said first substrate being disposed opposite said second substrate and being disposed a first distance apart, each of said substrates having an inner surface and an outer surface opposite the inner surface;
a liquid crystal layer sandwiched between the inner surfaces of the substrates, said liquid crystal layer including a plurality of liquid crystal molecules;
a first electrode formed on the inner surface of the first substrate, said first electrode having a first width; and
a second electrode formed on the inner surface of the first substrate, said second electrode having a second width, and spaced apart from said first electrode by a second distance, said first electrode and said second electrode being capable of aligning the liquid crystal molecules using an electric field produced between said first electrode and said second electrode,
wherein the first and second electrodes are made of a transparent conductor, and the first distance is greater in length than the second distance.

2. The liquid crystal display in claim 1, wherein the first and second electrodes each has a width to such a degree that the liquid crystal molecules overlying the surfaces of the electrodes are substantially oriented by the electric field.

3. The liquid crystal display in claim 1, wherein the second distance is approximately in a range of 0.1 $\mu$m to 5.0 $\mu$m.

4. The liquid crystal display in claim 1, wherein a ratio of the second width to the first width is approximately in a range of 0.25 to 4.0.

5. The liquid crystal display in claim 1, wherein the first and second widths each is approximately in a range of 1 $\mu$m to 8 $\mu$m.

6. The liquid crystal display in claim 5, wherein the liquid crystal molecules are arranged such that in an absence of the electric field, their longer axes are parallel to the surfaces of the first and second substrates, while in the presence of the electric field, optical axis of an incident light is parallel or normal to the electric field direction.

7. The liquid crystal display in claim 5, further comprising a first alignment layer formed over the inner surface of the first substrate and a second alignment layer formed over the inner surface of the second substrate, the first alignment layer having a first rubbing axis which differs by a first selected angle from the electric field direction and arranging the liquid crystal molecules to a direction of the first rubbing axis in the presence of the electric field, and the second alignment layer having a second rubbing axis which differs by a second selected angle from the electric field direction and arranging the liquid crystal molecules to a direction of the second rubbing axis in the presence of the electric field.

8. The liquid crystal display in claim 7, wherein the liquid crystal molecules have a pretilt angle, the pretilt angle being approximately in a range of 0 degree to 10 degrees.

9. The liquid crystal display in claim 8, wherein the first rubbing axis differs by 180 degrees from the second rubbing axis.

10. The liquid crystal display in claim 9, further comprising a polarizer disposed on the outer surface of the first substrate and an analyzer disposed on the outer surface of the second substrate, the polarizer having a polarizing axis in a given direction, the polarizing axis being optically related with the liquid crystal layer, the analyzer having an absorbing axis in a given direction, the absorbing axis being optically related with the polarizer.

11. The liquid crystal display in claim 10, wherein an angle between the polarizing axis of the polarizer and the first rubbing axis of the first alignment layer is approximately in a range of 0 degree to 90 degrees, and an angle between the absorbing axis of the analyzer and the polarizing axis of the polarizer is approximately 90 degrees.

12. The liquid crystal display in claim 11, wherein when an angle between the first rubbing axis and the electric field direction is approximately in a range of 0 degree to 45 degrees, dielectric anisotropy of the liquid crystal layer is negative, while when an angle between the first rubbing axis and the electric field direction is approximately in a range of 45 degrees to 90 degrees, dielectric anisotropy of the liquid crystal is positive.

13. The liquid crystal display in claim 12, wherein the liquid crystal layer is a nematic liquid crystal, and a product of the anisotropy of refractive index of the liquid crystal molecules in the liquid crystal layer and the first distance is approximately in a range of 0.2 $\mu$m to 0.6 $\mu$m.

14. The liquid crystal display in claim 5, wherein the liquid crystal layer is a nematic liquid crystal, and a product of the anisotropy of the refractive index of the liquid crystal molecules in the liquid crystal layer and the first distance is approximately in a range of 0.2 $\mu$m to 0.6 $\mu$m.

15. The liquid crystal display in claim 5, wherein the first electrode is a counter electrode to which a common signal is applied and the second electrode is a pixel electrode to which a display signal is applied.

16. The liquid crystal display in claim 1, wherein the transparent conductor is ITO.

17. A liquid crystal display comprising:
a first substrate and a second substrate, said first substrate being disposed opposite said second substrate and being disposed a first distance apart, each of said substrates having an inner surface and an outer surface opposite the inner surface;
a liquid crystal layer sandwiched between the inner surfaces of the substrates, said liquid crystal layer including a plurality of liquid crystal molecules;
a first electrode formed on the inner surface of the first substrate, the first electrode comprising a plurality of strips, each of the strips having a first width, and spaced apart by a second distance from another strip adjacent thereto;
a second electrode formed on the inner surface of the first substrate, the second electrode comprising a plurality of strips, each of the strips being disposed between the strips of the first electrode, having a second width, and being spaced apart by a third distance from another strip adjacent thereto, each of the strips of the second electrode being separated from each of the strips of the first electrode adjacent thereto with a fourth distance; and
an insulating layer for insulating the first electrode and the second electrode each other,
wherein the first electrode and the second electrode each is made of a transparent conductor,
wherein the first distance is greater in length than the fourth distance, and the second width is smaller than the second distance, and the first width is smaller than the third distance; and
wherein the strips of the first and second electrodes each has a width to such a degree that the liquid crystal molecules overlying the strips of the first electrode and the strips of the second electrode are substantially aligned in the presence of the electric field produced between the strips of the first electrode and the strips of the second electrode.

18. The liquid crystal display in claim 17, wherein said transparent conductor is ITO.

19. The liquid crystal display in claim 18, wherein said fourth distance is approximately in a range of 0.1 $\mu$m to 5 $\mu$m.

20. The liquid crystal display in claim 19, wherein a ratio of the second width to the first width is approximately in a range of 0.2 to 4.0.

21. The liquid crystal display in claim 20, wherein the first width and the second width each is approximately in a range of 1 $\mu$m to 8 $\mu$m.

22. The liquid crystal display in claim 21, wherein the first electrode further comprises a first body connecting one sided ends of the strips of said first electrode to each other.

23. The liquid crystal display in claim 22, wherein the second electrode further comprises a first connecting, said first connecting portion connecting one sided ends of the strips of said first electrode to each other, and said first connecting portion being overlapped with the first body.

24. The liquid crystal display in claim 23, wherein said first electrode further comprises a second body for connecting the other sided ends of the strips to each other, and said second electrode further comprises a second connecting portion, and being overlapped with said second body.

25. The liquid crystal display in claim 22, wherein the first electrode further comprises a second connecting portion parallel to the first body of the first electrode, for connecting the other sided ends of the strips.

26. The liquid crystal display in claim 23, further comprising a first alignment layer formed on the inner surface of the first substrate and a second alignment layer formed on the inner surface of the second substrate, the first alignment layer having a first rubbing axis which differs by a first selected angle from the electric field direction, and arranging the liquid crystal molecules to a direction of the first rubbing axis in the presence of the electric field, and the second alignment layer having a second rubbing axis which differs by a second selected angle from the electric field direction, and arranging the liquid crystal molecules to a direction of the second rubbing axis in the presence of the electric field.

27. The liquid crystal display in claim 26, wherein the liquid crystal molecules have a pretilt angle, the pretilt angle being approximately in a range of 0 degree to 10 degrees.

28. The liquid crystal display in claim 27, wherein the first rubbing axis of the first alignment layer differs by about 180 degrees from the second rubbing axis of the second alignment layer.

29. The liquid crystal display in claim 28, further comprising a polarizer disposed on the outer surface of the first substrate and an analyzer disposed on the outer surface of the second substrate, the polarizer having a polarizing axis in a given direction, the polarizing axis being optically related with the liquid crystal layer, the analyzer having an absorbing axis in a given direction, the absorbing axis being optically related with the polarizer.

30. The liquid crystal display in claim 29, wherein an angle between the polarizing axis of the polarizer and the first rubbing axis of the first alignment layer is approximately 0 degree or 90 degrees, and an angle between the absorbing axis of the analyzer and the polarizing axis of the polarizer is approximately 90 degrees.

31. The liquid crystal display in claim 30, wherein when an angle between the first rubbing axis and the electric field direction is approximately in a range of 0 degree to 45 degrees, dielectric anisotropy of the liquid crystal layer is negative, while when an angle between the first rubbing axis and the electric field direction is approximately in a range of 45 degrees to 90 degrees, dielectric anisotropy of the liquid crystal is positive.

32. The liquid crystal display in claim 31, wherein the liquid crystal layer is a nematic liquid crystal, and a product of the anisotropy of the refractive index of the liquid crystal molecules in the liquid crystal layer and the first distance is approximately in a range of 0.2 $\mu$m to 0.6 $\mu$m.

33. The liquid crystal display in claim 17, wherein the second width is the same as the second distance, and the first width is the same as the third distance.

34. The liquid crystal display in claim 33, wherein a ratio of the second width to the first width is approximately in a range of 0.2 to 4.

35. The liquid crystal display in claim 34, wherein the first and second widths each is approximately in a range of 1 $\mu$m to 8 $\mu$m.

36. The liquid crystal display in claim 35, wherein said first electrode further comprises a first body for connecting the other sided ends of the strips to each other.

37. The liquid crystal display in claim 36, wherein said second electrode further comprises a first connecting portion, and being overlapped with said first body.

38. The liquid crystal display in claim 37, wherein said first electrode further comprises a second body, and said second electrode further comprises a second connecting portion parallel to said second body, for connecting the other sided ends of the strips thereof.

39. The liquid crystal display in claim 36, wherein said second electrode further comprises a second connecting portion for connecting the other sided ends of the strips thereof.

40. The liquid crystal display in claim 37, further comprising a first alignment layer formed on the inner surface of the first substrate and a second alignment layer formed on the inner surface of the second substrate, the first alignment layer having a first rubbing axis which differs by a first selected angle from the electric field direction, and arranging the liquid crystal molecules to a direction of the first rubbing axis in the presence of the electric field, and the second alignment layer having a second rubbing axis which differs by a second selected angle from the electric field direction, and arranging the liquid crystal molecules to a direction of the second rubbing axis in the presence of the electric field.

41. The liquid crystal display in claim 40, wherein the liquid crystal molecules have a pretilt angle, the pretilt angle being approximately in a range of 0 degree to 10 degrees.

42. The liquid crystal display in claim 41, wherein the first rubbing axis of the first alignment layer differs by about 180 degrees from the second rubbing axis of the second alignment layer.

43. The liquid crystal display in claim 42, further comprising a polarizer disposed on the outer surface of the first substrate and an analyzer disposed on the outer surface of the second substrate, the polarizer having a polarizing axis in a given direction, the polarizing axis being optically related with the liquid crystal layer, the analyzer having an absorbing axis in a given direction, the absorbing axis being optically related with the polarizer.

44. The liquid crystal display in claim 43, wherein an angle between the polarizing axis of the polarizer and the first rubbing axis of the first alignment layer is approximately 0 degree or 90 degrees, and an angle between the absorbing axis of the analyzer and the polarizing axis of the polarizer is approximately 90 degrees.

45. The liquid crystal display in claim 44, wherein when an angle between the first rubbing axis and the electric field direction is approximately in a range of 0 degree to 45 degrees, dielectric anisotropy of the liquid crystal layer is negative, while when an angle between the first rubbing axis and the electric field direction is approximately in a range of 45 degrees to 90 degrees, dielectric anisotropy of the liquid crystal is positive.

46. The liquid crystal display in claim 45, wherein the liquid crystal layer is a nematic liquid crystal, and a product of the anisotropy of the refractive index of the liquid crystal molecules in the liquid crystal layer and the first distance is approximately in a range of 0.2 $\mu$m to 0.6 $\mu$m.

47. The liquid crystal display in claim 17, wherein the second width is greater than the second distance, and the first width is greater than the third distance.

48. The liquid crystal display in claim 16, wherein the gate bus lines, data bus lines, and common signal lines are formed of one element metal or alloy of at least two elements selected from the group being comprised of Al, Mo, Ti, W, Ta, and Cr.

49. The liquid crystal display as claimed in claim 16, wherein a product of the anisotropy of the refractive index of the liquid crystal molecules in the liquid crystal layer and the first distance is approximately in a range of 0.2 $\mu$m to 0.6 $\mu$m.

* * * * *